(12) United States Patent
Usuda et al.

(10) Patent No.: US 8,400,120 B2
(45) Date of Patent: Mar. 19, 2013

(54) SWITCHING POWER SUPPLY UNIT

(75) Inventors: Takeshi Usuda, Toyama (JP); Yoshiki Matsuo, Hachioji (JP); Takeshi Takayanagi, Toyama (JP); Yasuhiro Masuya, Toyama (JP)

(73) Assignee: Cosel Co., Ltd., Toyama-Shi (JP)

( * ) Notice: Subject to any disclaimer, the term of this patent is extended or adjusted under 35 U.S.C. 154(b) by 334 days.

(21) Appl. No.: 12/910,927

(22) Filed: Oct. 25, 2010

(65) Prior Publication Data
US 2011/0096571 A1   Apr. 28, 2011

(30) Foreign Application Priority Data

Oct. 26, 2009   (JP) .................. 2009-245359

(51) Int. Cl.
*G05F 1/00*   (2006.01)
(52) U.S. Cl. .............. 323/222; 323/284; 700/298
(58) Field of Classification Search ........... 363/16–20, 363/37, 40, 21.02, 21.06, 21.14, 41, 60; 323/207, 323/222, 224, 271, 274, 282–289; 307/38, 307/39, 41, 118, 141; 700/11–14, 28, 32, 700/37, 44
See application file for complete search history.

(56) References Cited

FOREIGN PATENT DOCUMENTS
| JP | 2005-184964 A | 7/2005 |
| JP | 2008-099539 A | 4/2008 |
| JP | 2008-125286 A | 5/2008 |

OTHER PUBLICATIONS

T. Usuda et al; Improvement in Transient Characteristics of Digital-Controlled DC-DC Converter With PWM Control of Predicting Switch Timing; IEICE Technical Report; Oct. 2009.

*Primary Examiner* — Rajnikant Patel
(74) *Attorney, Agent, or Firm* — Holtz, Holtz, Goodman & Chick, P.C.

(57) ABSTRACT

A control function formula which provides a relationship between an output voltage signal Vo and an output differential value with, for example, a negative linear function is defined in a calculation means. The calculation means samples an input voltage signal, an output voltage signal and an output differential signal at time instants in synchronization with a cycle of switching of a main switching element, and calculates subsequent ON and OFF durations of the main switching elements such that the control function formula might be satisfied. A drive pulse generation means generates a drive pulse with which the main switching element is turned on and off based on the ON and OFF durations determined by the calculation means. The output differential signal is generated by, for example, a capacitor current detection means or an observer device which detect a current of a smoothing capacitor.

15 Claims, 20 Drawing Sheets

(a)

(b)

SWITCHING POWER SUPPLY UNIT

BACKGROUND OF THE INVENTION

1. Field of the Invention

The present invention relates to a switching power supply unit which regulates an output voltage using a digital control circuit.

2. Description of the Related Art

In a related art switching power supply unit, an output voltage is regulated by, for example, pulse width modulation (PWM) control or pulse frequency modulation (PFM) control with a highly intelligent digital control circuit using, for example, a digital processor. Recently, various switching power supply units provided with high speed digital control for the reduction of a transient fluctuation in an output voltage in response to a sudden change in an external environment of the power supply unit have been proposed.

For example, as disclosed in Japanese Patent Application Laid-open No. 2008-125286, an exemplary related art switching power supply unit includes: a deviation calculation means which calculates a deviation from a difference between a sampled output voltage and a reference voltage; a deviation estimate calculation means which estimates a deviation in the next cycle; and a controlled variable computing means which calculates a controlled variable for the control of a pulse width of a switching element. A coefficient $\alpha$ is included in an estimate calculation formula (linear model) defined in the deviation estimate calculation means and thus the controlled variable can be adjusted by changing the coefficient $\alpha$.

As disclosed in Japanese Patent Application Laid-open No. 2005-184964, another exemplary related art power unit performs calculations based on a value of a sampled input voltage and an output voltage, obtains the ON duration and the OFF duration of a main switching element independently and controls the main switching element to turn on or off using the obtained ON or OFF duration. In the calculations, each deviation is obtained from the sampled input voltage and a difference between the output voltage and the reference voltage, and calculates the ON duration and the OFF duration in which the output voltage is equal to the reference voltage.

As disclosed in Japanese Patent Application Laid-open No. 2008-99539, a further exemplary related art switching power supply unit includes: a determination means which determines whether a difference between a sampled output voltage and a reference voltage (i.e., a target voltage) is in a predetermined range; a controlled variable calculation means which calculates a controlled variable of an output voltage based on, for example, the difference and an average value of the output voltage; and a control signal output means which controls the main switching element to be turned on or off based on the calculated controlled variable. The controlled variable calculation means accelerates the control by reducing the number of sampling or increasing the controlled variable by changing a coefficient of a controlled variable calculation formula when the fluctuation in the output voltage exceeds a reference value.

Here, exemplary situations of rapid fluctuations in an external environment of the switching power supply unit may include a rapid fluctuation in the input voltage during operation or a sudden increase or decrease in a load current in response to a change in a state of the load. An operation of the switching power supply unit when an input voltage is placed in a non-operating switching power supply unit is also a sudden change in the external environment.

The switching power supply unit used in, for example, information and communication equipment or and a server, should have high speed response characteristics of the output voltage control in response to a sudden change in the load because a sudden change in the load current from about zero to a rated load may occur frequently. In a system in which voltage is supplied to many board substrates from one input power line, it is assumed that, when another board substrate is hot swap for maintenance, a loading state of the power source line of the system changes and the input voltage of the switching power supply unit which operates in response to the power supply from the power source line changes suddenly. Accordingly, high speed response characteristics of the output voltage control in response to the rapid fluctuation in the input voltage are required for such a system. If transient overshoot or vibration occur when an input voltage is placed or in a process in which an output voltage increases from zero to reach a predetermined output voltage, there is a possibility that the electronic equipment connected as a load may malfunction or break down. Accordingly, in various applications, it is required that an output voltage of a switching power supply unit increases monotonically.

In the above-described switching power supply unit disclosed in Japanese Patent Application Laid-open No. 2008-125286, since forecasting control (i.e., feed-forward control) is performed based on a sampled output voltage, a response to a sudden change in the load is rapid as compared with normal feedback control. However, the input voltage is not considered during determination of the controlled variable. Accordingly, the fluctuation in the output voltage in response to the rapid fluctuation in the input voltage cannot be reduced significantly. Further, prevention of transient overshoot or vibration when an input voltage is placed is not considered.

In the power unit disclosed in Japanese Patent Application Laid-open No. 2005-184964, the feed-forward control is performed based on the sampled input voltage and thus the change in the controlled variable is gradual and relatively slow. Thus, although the time until the fluctuation in the output voltage in response to a sudden change in the load is relatively short, the amount of the fluctuation is not significantly small. Further, prevention of transient overshoot or vibration when a voltage is input is not considered.

In the switching power supply unit disclosed in Japanese Patent Application Laid-open No. 2008-99539, it may be possible that a fluctuation in an output voltage in response to a rapid fluctuation in an input voltage or a sudden change in a load can be reduced to some extent by accelerating and increasing a gain of the response of the feedback-control of the output voltage. However, prevention of transient overshoot or vibration when a voltage is input is not considered.

SUMMARY OF THE INVENTION

In view of the aforementioned circumstances, an object of the present invention is to provide a digital control switching power supply unit with high speed response performance for reducing a fluctuation in an output voltage in response to a rapid fluctuation in an input voltage or a sudden change in a load, and capable of easily avoiding occurrence of transient overshoot or vibration to the output voltage when an input voltage is placed.

An aspect of the present invention is a switching power supply unit which includes: a power converter circuit including a main switching element which is turned on and off; and a control circuit which regulates an output voltage by controlling turning on and off operation of the main switching element, wherein: the control circuit includes calculation means which determines an ON duration and an OFF duration of the main switching element and drive pulse generation means which generates drive pulses with which the main switching element is turned on and off; a control function formula is defined in the calculation means, the control function formula being a continuous function formula which includes, as parameters, an output voltage and an output differential value representing a fluctuation in the output voltage, and has only a single output differential value corresponding to a certain value of the output voltage, the control function formula providing that a corresponding output differential value is positive when an output voltage is below a target value for a regulation of the output voltage, that a corresponding output differential value is negative when an output voltage is above the target value and that a corresponding output differential value is zero when an output voltage is equal to the target value; the calculation means samples an input voltage signal of which input voltage has been detected, an output voltage signal of which output voltage has been detected or estimated and an output differential signal of which a fluctuation in an output voltage has been detected or estimated at time instants in synchronization with a cycle of switching of the main switching element, performs a predetermined calculation based on the sampled three signals and calculates at least one of the ON and OFF durations of the main switching element in a cycle of switching after the time instant for sampling and, in the ON and OFF durations, an output voltage and an output differential value at the next or after the next time instant for sampling satisfy a relationship provided by the control function formula; and the drive pulse generation means generates the drive pulses such that the main switching element might be turned on and off in a cycle of switching after the time instant for sampling of the three signals based on the ON and OFF durations determined by the calculation means.

The calculation means performs the sampling of each signal and the calculation for obtaining at least one of the ON and OFF durations in each cycle of switching of the main switching element.

The power converter circuit stops supplying power to an output from an input DC power supply and a built-in inductance element is excited by the input DC power supply in the ON duration of the main switching element and releases excitation energy accumulated in the inductance element to the output and supplies power in the OFF duration of the main switching element; and the calculation means performs the sampling of each signal in the duration in which the inductance element is releasing excitation energy.

The drive pulse generation means generates a drive pulse in which the same durations are set as the ON duration of the main switching element before and after a midpoint of the cycle of sampling of each signal or generates a drive pulse in which the same durations are set as the OFF duration of the main switching element before and after the midpoint of the cycle of sampling.

The power converter circuit supplies power to an output in the ON duration of the main switching element and excites a built-in inductance element with the input DC power supply to release excitation energy accumulated in the inductance element in the OFF duration of the main switching element to continuously supply the power to the output; the calculation means performs the sampling of each signal and the calculation for calculating at least one of the ON and OFF durations in half a cycle of switching of the main switching element; and the drive pulse generation means generates a drive pulse in which durations before and after a second time instant for sampling in one cycle of switching are set to be ON durations of the main switching element or generates a drive pulse in which durations before and after a second time instant for sampling in one cycle of switching are set to be OFF durations of the main switching element.

A capacitor current detection circuit is further provided which detects a current which flows through a smoothing capacitor and outputs a capacitor current signal, an output voltage being generated at both sides of the smoothing capacitor, wherein the calculation means samples an input voltage signal of which input voltage has been detected, an output voltage signal of which output voltage has been detected and a capacitor current output signal output from the capacitor current detection means and, based on the sampled three signals, performs a predetermined calculation using the capacitor current signal as a signal corresponding to the output differential signal.

A differentiation circuit is further provided in which an output voltage is input and which outputs an output differential signal obtained through differentiation of the output voltage, wherein the calculation means samples an input voltage signal of which input voltage has been detected, an output voltage signal of which output voltage has been detected and an output differential signal output from the differentiation circuit and performs a predetermined calculation based on the sampled three signals.

The control circuit includes an observer which is a device of estimating a state variable of a circuit, the observer samples, at a time instant at which the calculation means samples the input voltage signal, the input voltage signal and an output voltage signal of which output voltage has been detected, and the calculation means obtains the ON and OFF durations determined immediately before the time instant for sampling and, based on the input voltage signal, the output voltage signal and a duty ratio, estimates an output voltage signal and the output differential signal at the next time instant for sampling; and the calculation means samples the input voltage signal, and the output voltage signal and the output differential signal estimated by the observer and performs a predetermined calculation based on the sampled three signals.

The control function formula defined in the calculation means may provide a relationship between an output voltage and an output differential value by a linear function with a negative slope. Alternatively, the control function formula defined in the calculation means may provide that the output differential value is made constant regardless of the output voltage in a range in which a difference between an output voltage and a target value exceeds a predetermined value.

The calculation means calculates the ON and OFF durations such that the total length of the ON and OFF durations might be constant. Alternatively, the calculation means may calculate the OFF duration or the ON duration such that the ON duration or the OFF duration might be constant.

When the ON and OFF durations determined by the calculation means exceed a maximum duty ratio which is variable as an ON-duration duty ratio, the drive pulse generation means generates a drive pulse with which the main switching element is turned on or off at the maximum duty ratio; and when the ON and OFF durations determined by the calculation means are below a minimum duty ratio which is variable as an ON-duration duty ratio, the drive pulse generation means generates a drive pulse with which the main switching element is turned on or off at the minimum duty ratio.

The calculation means calculates the ON and OFF durations such that an ON-time duty ratio with respect to a cycle of switching might be constant. When the total length of the ON and OFF durations determined by the calculation means exceeds the variable maximum duration, the drive pulse generation means generates a drive pulse with which the main switching element is turned on or off in the maximum duration, and when the total length of the ON and OFF durations determined by the calculation means is below the variable minimum duration, the drive pulse generation means generates a drive pulse with which the main switching element is turned on or off in the minimum duration.

In the switching power supply unit of the present invention, a control function formula is defined in the calculation means of the control circuit, the control function formula includes the target value of the output voltage, and the relationship between the output voltage and the output differential value is defined by, for example, a linear function with negative slope. With this, the switching power supply unit of the present invention calculates the ON and OFF durations and controls turning ON and OFF of the main switching element based on the input voltage signal which is a detection value, the output voltage signal and the output differential signal which are detection values (or estimates based on the detection value) so as to satisfy the above-described control function. Accordingly, when the input voltage or the output voltage fluctuates rapidly, the information regarding the rapid fluctuation will be immediately reflected in the calculation and, as a result, a response to the rapid fluctuation in the input voltage or the sudden change in the load is rapidly made. When no proper solution of the controlled variable is obtained using the control function formula, the ON duration or the OFF duration of the main switching element is uniformly set to the maximum or the minimum and thus the controlled variable which reduces a deviation between the output voltage and the target value becomes the maximum instantaneously. By defining a relationship between the output voltage and the output differential value in a relationship of a predetermined straight line and a polygonal line with a control function formula, the calculation is simplified and occurrence of transient overshoot or vibration in the output voltage when a voltage is input.

The output differential signal can be easily obtained by observing the current which flows into the smoothing capacitor at which both ends an output voltage is generated, or observing the output voltage via the differentiation circuit.

By providing an observer which is a means which estimates a state variable in a control circuit and estimating an output voltage signal and an output differential value for the next sampling based on, for example, an output voltage signal and an input voltage signal which are detection values, a circuit configuration for detecting the output differential signal can be simplified.

DETAILED DESCRIPTION OF THE EMBODIMENTS

Figure 1:
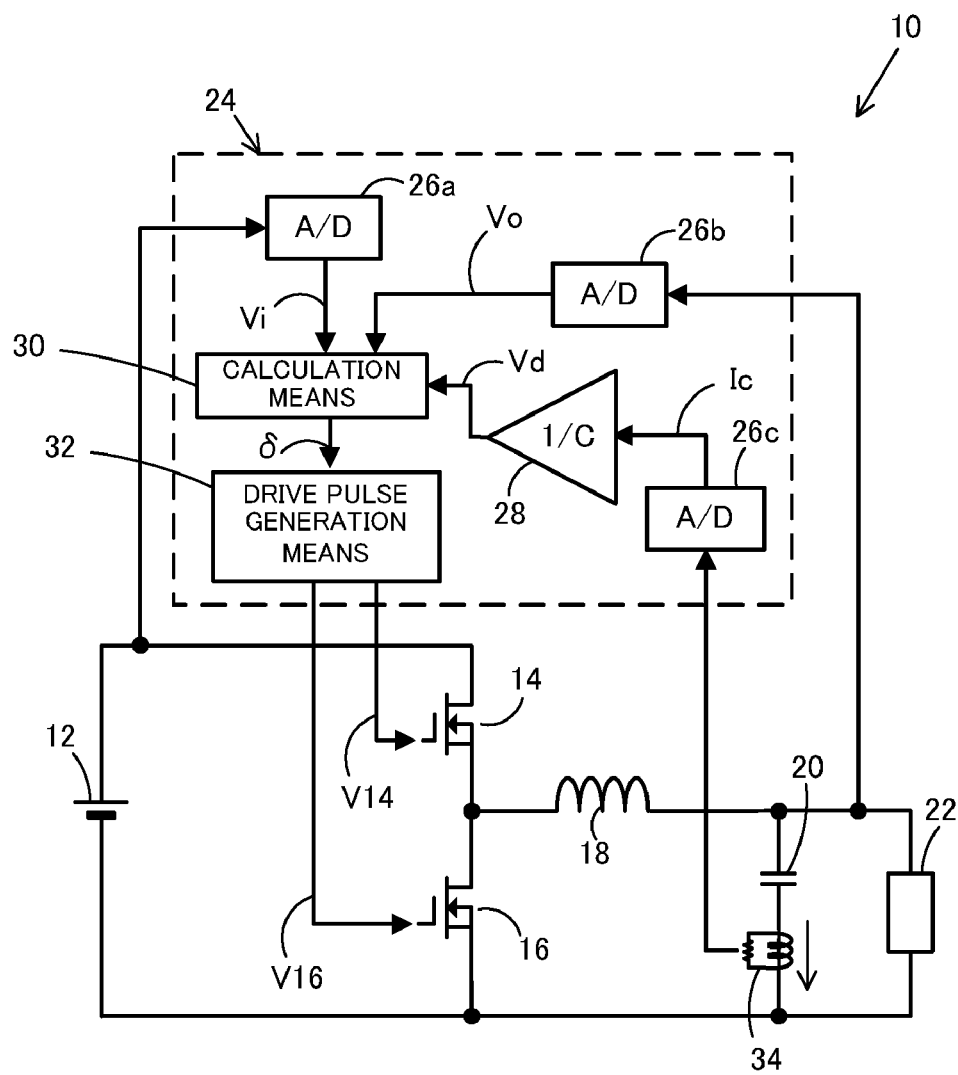
FIG. 1 is a circuit diagram of a switching power supply unit according to a first embodiment of the present invention.

Hereinafter, a switching power supply unit according to a first embodiment of the present invention will be described with reference to FIGS. 1 to 5B. A switching power supply unit 10 according to the first embodiment includes a main switching element 14, a rectifier 16, a smoothing inductor 18 and a smoothing capacitor 20. The main switching element 14 switches on and off of an input voltage supplied from an input DC power supply 12. The rectifier 16 is connected between an output side of the main switching element 14 and the ground to switch on and off complementarily with the main switching element 14. The smoothing inductor 18 and the smoothing capacitor 20 altogether constitute a low pass filter which smoothes intermittent voltage generated at both sides of the rectifier 16. A DC output voltage generated at both sides of the smoothing capacitor 20 is supplied to a load 22. The main switching element 14 and the rectifier 16 are N-channel MOSFETs and are turned on and off by a drive pulse of a predetermined duty ratio output from a control circuit 24 which regulates output voltages. That is, the switching power supply unit 10 is provided with a common step-down chopper power converter circuit.

In the power converter circuit, power is supplied to the output side load 22 from the input DC power supply 12 in an ON duration of the main switching element 14 and the built-in smoothing inductor 18 is excited by the input DC power supply 12. Excitation energy accumulated in the smoothing inductor 18 is released in an OFF duration of the main switching element 14 and the power is continuously supplied to the output side load 22.

The control circuit 24 includes a plurality of analog-to-digital converters (hereinafter, referred to as "A/D converters") 26a, 26b and 26c, a conversion means 28, a calculation means 30 and a drive pulse generation means 32. Analog information of which input voltage has been detected is input to the A/D converter 26a. The A/D converter 26a samples the input analog information at time instants in synchronization with a cycle of switching of the main switching element 14, i.e., at predetermined time instants in the ON duration of the main switching element 14 or a duration in which the smoothing inductor 18 is releasing the excitation energy. The A/D converter 26a converts the sampled analog information into an input voltage signal Vi as digital information and outputs the same. Analog information of which output voltage has been detected is input to the A/D converter 26b, which converts the input analog information into an output voltage signal Vo as digital information in a similar cycle of sampling and outputs the same. Analog information of a current which flows through the smoothing capacitor 20 detected by a capacitor current detection means 34 is input to the A/D converter 26c, which converts the input analog information into a capacitor current signal Ic as digital information in a similar cycle of sampling and outputs the same.

The conversion means 28 divides the capacitor current signal Ic by capacity C of the smoothing capacitor 20 and outputs the quotient as an output differential signal Vd which represents a fluctuation in the output voltage. The conversion means 28 may be provided integrally with the later-described calculation means 30. In particular, the conversion of the capacitor current signal Ic into the output differential signal Vd may be included in a calculation performed by the calculation means 30.

In the calculation means 30, a control function formula is defined which includes an output voltage and an output differential value as parameters and provides a relationship between these parameters. The control function formula is a continuous function formula which has a target value of regulation of an output voltage as a constant and has only a single output differential value corresponding to a certain value of the output voltage. The control function formula provides the following relationships: a corresponding output differential value is positive when an output voltage is below the target value; a corresponding output differential value is negative when an output voltage is above the target value; and a corresponding output differential value is zero when an output voltage is equal to the target value.

Here, the control function formula is a linear function formula with a negative slope and, in particular, provides a relationship between an output voltage and an output differential value is given by Formula (1).

[Formula 1]

$$Vd = -\frac{1}{s}(Vo - Vref) \quad (1)$$

where s is a fixed positive constant and $(-1-/s)$ is a slope. Vref is a target value for the regulation of an output voltage.

The calculation means 30 further samples the input voltage signal Vi input from the A/D converter 26a of which input voltage has been detected, the output voltage signal Vo input from the A/D converter 26b of which output voltage has been detected and the output differential signal Vd input from the conversion means 28 of which a fluctuation in the output voltage has been detected in the similar cycle of sampling described above. The calculation means 30 then performs a predetermined calculation based on these three signals and obtains an ON duration and an OFF duration of the main switching element 14 after the sampling is made such that a relationship between the output voltage Vo which is to be detected at the next time instant for sampling and the output differential signal Vd might satisfy Formula (1). Here, the ON and OFF durations are calculated under the conditions that the total of the ON and OFF durations might be kept constant and that certain PWM control might be performed on the cycle of switching.

The drive pulse generation means 32 generates a drive pulse V14 for the main switching element 14 and a drive pulse V16 for the rectifier 16 based on the ON and OFF durations (or the cycle of switching and a duty ratio δ at which the main switching element is turned on) determined by the calculation means 30. The drive pulse V14 has a certain cycle of switching T and is at a high level in a duration with the duty ratio δ in which the main switching element 14 is turned on and is at a low level in other durations. The drive pulse V16 is a pulse voltage in the reverse phase with and in synchronization with the drive pulse V14. The drive pulse V16 is at a low level in the duration with the duty ratio δ in which the rectifier 16 is turned off and is at a high level in other durations.

Figure 2:
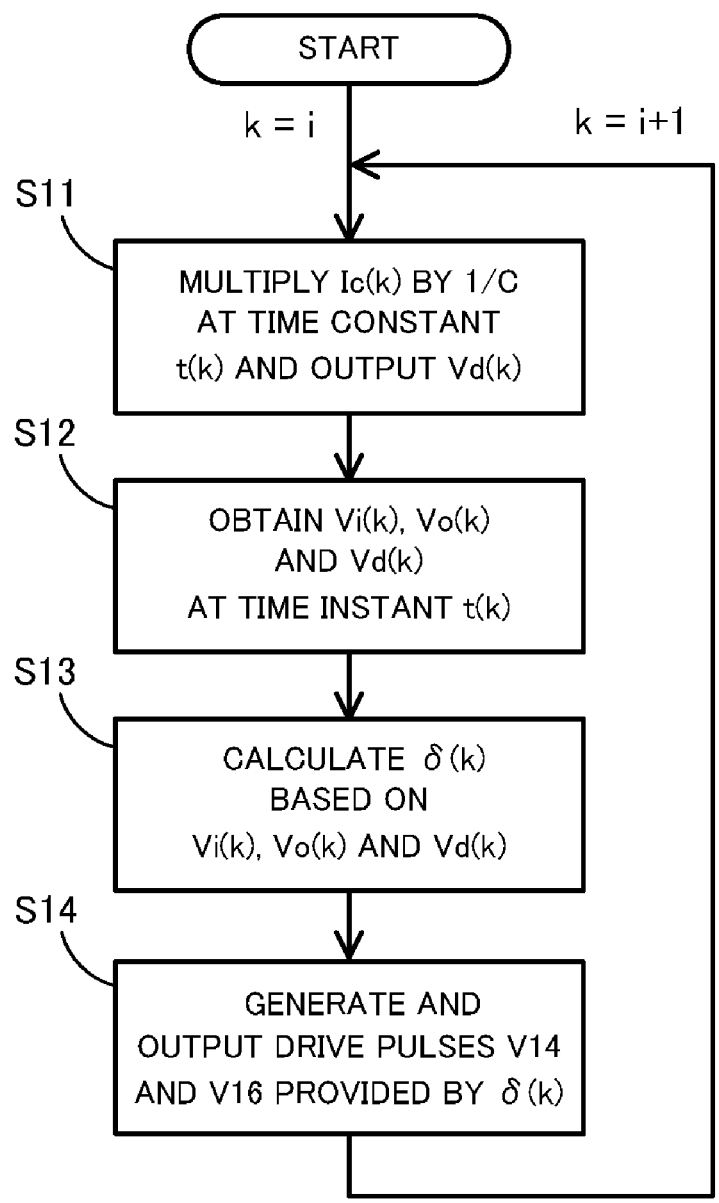
FIG. 2 is a flowchart illustrating a steady-state operation of the first embodiment of the present invention.
Figure 3:
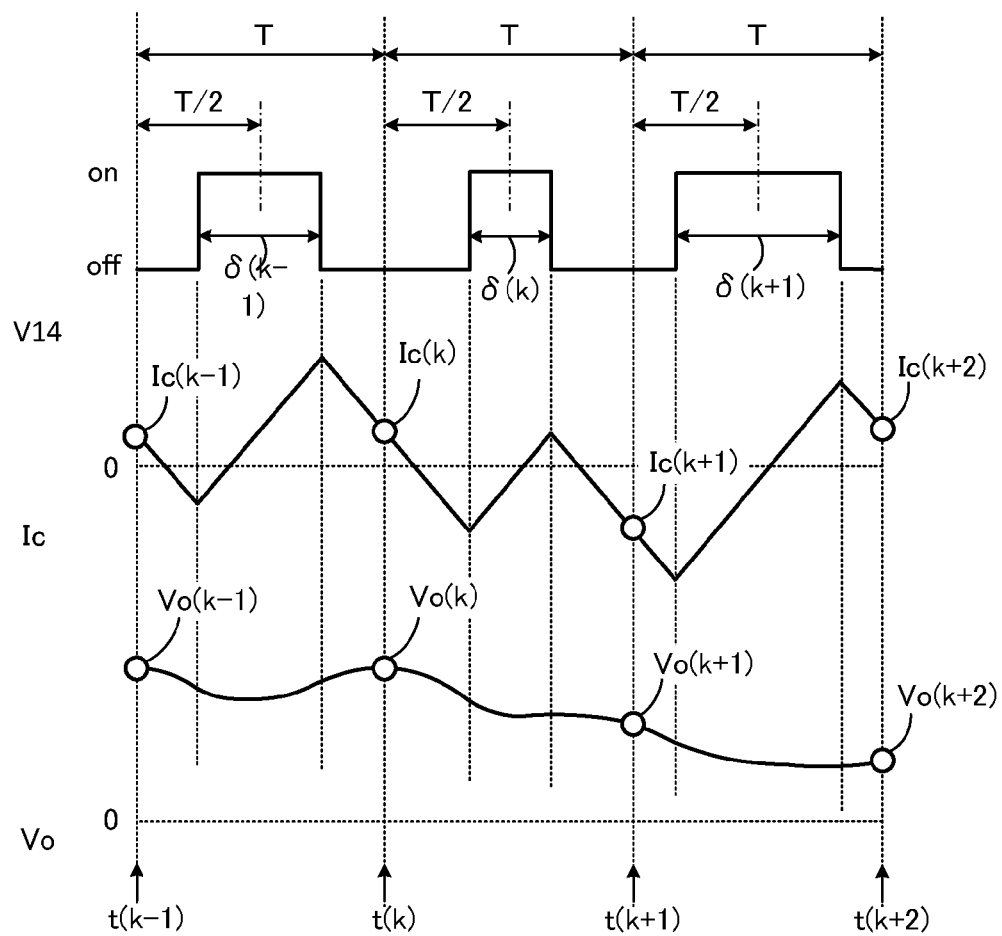
FIG. 3 is a timing diagram illustrating the steady-state operation of the first embodiment of the present invention.

Hereinafter, an operation of the switching power supply unit 10 will be described. Here, it is assumed that the time required for various, calculations performed in the control circuit 24 is sufficiently short and thus can be ignored. FIGS. 2 and 3 each illustrate a steady-state operation of the switching power supply unit 10 after an input voltage is placed. A cycle of sampling each signal by the calculation means 30 is T, which is the same as that for switching. The calculation means 30 samples at time instants t(k−1), t(k), t(k+1) and t(k+2) in each cycle of sampling T. Even during the steady-state operation of the switching power supply unit 10, the ON and OFF durations of the main switching element 14 change slightly in each cycle of switching due to influences of relatively small disturbances (e.g., a change in the ambient temperature). Such a slight change is illustrated in FIG. 3 for the illustration of the steady-state operation.

First, at the time instant t(k), the conversion means 28 divides a capacitor current signal Ic(k) by capacity C of the smoothing capacitor 20 and outputs an output differential signal Vd(k) (step S11). At the same time instant t(k), the calculation means 30 samples an input voltage signal Vi(k), an output voltage signal Vo(k) and an output differential signal Vd(k) (step S12). Then, a next duty ratio δ(k) of the main switching element 14 is calculated through a predetermined calculation (step S13). The duty ratio δ(k) is defined by Formula 2.

[Formula 2]

$$\delta(k) = \frac{ton(k)}{T} = \frac{T - toff(k)}{T} \quad (2)$$

where T is a cycle of switching and ton(k) and toff(k) each are ON and OFF durations of the main switching element 14.

Hereinafter, details of the calculation in the calculation means 30 to obtain the duty ratio $\delta(k)$ will be described. Since the slope of the capacitor current Ic is proportional to the reciprocal of the inductance L of the smoothing inductor 18, a capacitor current signal Ic(k+1) at the next time instant t(k+1) for sampling is given by Formula 3 using each signal sampled at the time instant t(k), ton(k) and toff(k).

[Formula 3]

$$Ic(k+1) = Ic(k) + \frac{Vi(k) - Vo(k)}{L} \cdot ton(k) - \frac{Vo(k)}{L} \cdot toff(k) \quad (3)$$

Substituting the ON duration ton(k) and the OFF duration toff(k) in Formula 3 by the cycle of switching T and the duty ratio $\delta(k)$ yields Formula 4.

[Formula 4]

$$Ic(k+1) = Ic(k) - \frac{T}{L} \cdot Vo(k) + \frac{T}{L} \cdot Vi(k) \cdot \delta(k) \quad (4)$$

Substituting the capacitor current signals Ic(k) and Ic(k+1) in Formula 4 by the output differential signals Vd(k) and Vd(k+1) yields Formula 5. When a coefficient of Vo(k) in Formula 5 is denoted by $\alpha$, Formula 6 is yielded.

[Formula 5]

$$Vd(k+1) = Vd(k) - \frac{T}{LC} \cdot Vo(k) + \frac{T}{LC} \cdot Vi(k) \cdot \delta(k) \quad (5)$$

[Formula 6]

$$Vd(k+1) = Vd(k) + \alpha \cdot Vo(k) \alpha \cdot Vi(k) \cdot \delta(k) \quad (6)$$

That is, if the next duty ratio of the time instant for sampling t(k) is denoted by $\delta(k)$, a forecasting calculation of the output differential signal Vd(k+1) at the next time instant t(k+1) for sampling is given by Formula 6.

The output voltage signal Vo(k+1) at the next time instant t(k+1) for sampling is given by Formula 7 using the output voltage signal Vo(k) and the capacitor current signals Ic(k) and Ic(k+1). Substituting Formula 7 by Formula 4 yields Formula 8.

[Formula 7]

$$Vo(k+1) = Vo(k) + \frac{T}{C} \cdot \frac{Ic(k) + Ic(k+1)}{2} \quad (7)$$

[Formula 8]

$$Vo(k+1) = \frac{T}{C} \cdot Ic(k) + \left(1 - \frac{T^2}{2LC}\right) \cdot Vo(k) + \frac{T^2}{2LC} \cdot Vi(k) \cdot \delta(k) \quad (8)$$

Substituting the capacitor current signal Ic(k) in Formula 8 by the output differential signal Vd(k) yields Formula 9. If a coefficient of Vo(k) in Formula 9 is denoted by $\beta$ and a coefficient of (Vi(k)·$\delta$(k)) is denoted by gamma, Formula 10 is yielded.

[Formula 9]

$$Vo(k+1) = T \cdot Vd(k) + \left(1 - \frac{T^2}{2LC}\right) \cdot Vo(k) + \frac{T^2}{2LC} \cdot Vi(k) \cdot \delta(k) \quad (9)$$

[Formula 10]

$$Vo(k+1) = T \cdot Vd(k) + \beta \cdot Vo(k) + \gamma \cdot Vi(k) \cdot \delta(k) \quad (10)$$

That is, if the next duty ratio of the time instant for sampling t(k) is denoted by $\delta(k)$, a forecasting calculation of the output voltage signal Vo(k+1) at the next time instant t(k+1) for sampling is given by Formula 10.

The calculation means 30 determines the duty ratio $\delta(k)$ such that the output differential signal Vd(k+1) in Formula 6 and the output voltage signal Vo(k+1) in Formula 10 might satisfy the relationship defined by Formula 1 as a control function formula. Accordingly, substituting Formulae 6 and 10 in Formula 1 and eliminating Vd(k+1) and Vo(k+1) yields Formula 11 and the duty ratio $\delta(k)$ which satisfies the above relationship can be obtained.

[Formula 11]

$$\delta(k) = \frac{-(T+s) \cdot Vd(k) - (\beta + s\alpha) \cdot Vo(k) + Vref}{(\gamma - s\alpha) \cdot Vi(k)} \quad (11)$$

Thus, in step S13, the input voltage signal Vi(k), the output voltage signal Vo(k) and the output differential signal Vd(k) sampled in step S12 are substituted in Formula 11 to obtain the duty ratio $\delta(k)$ until the next time instant t(k+1) for sampling.

Next, the drive pulse generation means 32 generates the drive pulse V14 for the main switching element 14 and the drive pulse V16 for the rectifier 16 based on the duty ratio $\delta(k)$ determined in step S13 (step S14). In the drive pulse V14, the same durations are set before and after the midpoint of the cycle of sampling T as the duration with the duty ratio $\delta(k)$ and, in that duration, the drive pulse V14 is at a high level at which the main switching element 14 is turned on. The drive pulse V16 is a pulse voltage in the reverse phase with the drive pulse V 14 and is at a low level in the duration with the duty ratio $\delta(k)$ at which the rectifier 16 is turned off.

A PWM control is performed on the switching power supply unit 10 by repeating steps S11 to S14 such that the output voltage might be equal to the target value Vref. In Formula 11 for the calculation of the duty ratio $\delta(k)$, conduction resistance of the main switching element 14 and the rectifier 16 and existence of resistance parasitic to the smoothing inductor 18 and the wiring pattern are not considered. Thus, an error may be included in setting of the output voltage. When such an error cannot be ignored, the duty ratio $\delta(k)$ may be calculated by incorporating the resistance in Formulae 3 to 11 to highly accurately control the output voltage.

Next, a transient operation of the switching power supply unit 10 will be described. Here, an ON-duration maximum duty ratio δmax and an ON-duration minimum duty ratio δmin are set in the drive pulse V14 which can be generated by the drive pulse generation means 32. The maximum duty ratio δmax is set in a range narrower than 100%, e.g., about 60% to 95%, for an improvement in safety of the power converter circuit or proper operations of functional blocks in synchronization with one another.

Figure 4A:
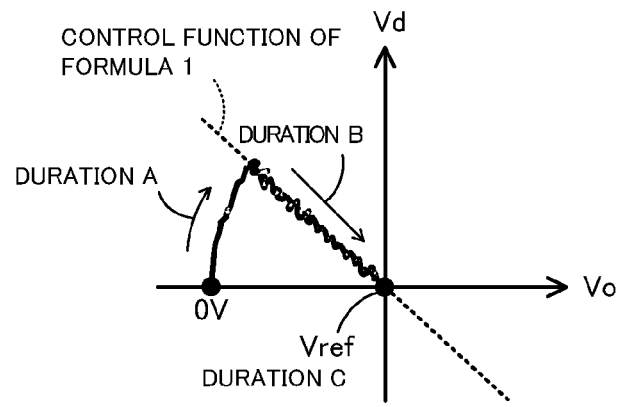
FIG. 4A is a graph of a control function formula illustrating an operation of the first embodiment of the present invention when an input voltage is placed.

A transient operation of the switching power supply unit 10 after an input voltage is placed in the non-operating switching power supply unit 10 from the input DC power supply 12 until the output voltage reaches the target value Vref is illustrated in FIG. 4. FIG. 4A is a graph in which the output voltage signal Vo is plotted in the horizontal axis and the output differential signal Vd is plotted in the vertical axis. A dashed straight line represents the relationship defined by Formula 1 as a, control function formula. When the switching power supply 10 is out of operation, the output voltage signal Vo is zero. When an input voltage is placed, the output voltage starts increasing, the output voltage signal Vo and the output differential signal Vd change along a locus represented by a solid line, and the output voltage signal Vo reaches the target value Vref and becomes stable.

Figure 4B:
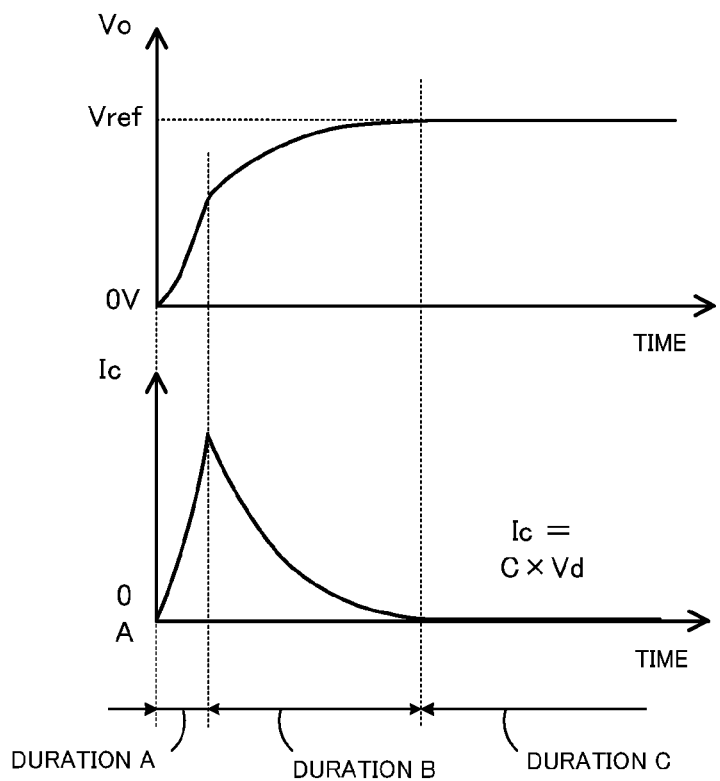
FIG. 4B is a timing diagram corresponding to FIG. 4A.

Since a difference between the output voltage signal Vo and the target value Vref is large in a duration A which is the duration immediately after an input voltage is placed as illustrated in FIG. 4B, the duty ratio δ(k) calculated by Formula 11 will exceed the ON-duration maximum duty ratio δmax. The drive pulse generation means 32 uniformly outputs the drive pulse V14 of the maximum duty ratio δmax when the duty ratio δ(k) calculated by the calculation means 30 is larger than the maximum duty ratio δmax. Accordingly, in the duration A, the output voltage increases rapidly with an extremely large controlled variable of the maximum duty ratio δmax.

Figure 4C:
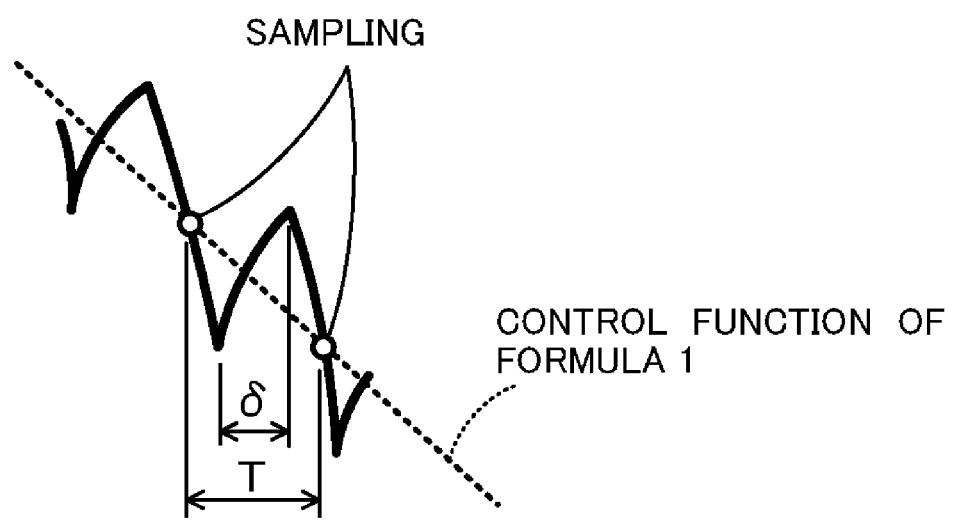
FIG. 4C is a graph illustrating an operation in a duration B.

In a duration B, the difference between the output voltage signal Vo and the target value Vref becomes smaller and the duty ratio δ(k) calculated by Formula 11 decreases below the maximum duty ratio δmax. The drive pulse generation means 32 then outputs the drive pulse V14 of the duty ratio δ(k) and drives the main switching element 14. Thus, the relationship between the output voltage signal Vo and the output differential signal Vd changes along the dashed line of the graph while satisfying the relationship defined by Formula 1. When seen in an enlarged view, an operation illustrated in FIG. 4C is performed in each cycle of switching T. Since Formula 1 is a control function formula representing the control of first order lag, the output voltage signal Vo increases along a curve of an exponential function in which a constant s is set to be a time constant, as illustrated in FIG. 4B. In a duration C, a difference between the output voltage signal Vo and the target value Vref is eliminated and the steady-state operation as illustrated in FIGS. 2 and 3 is started.

A transient operation at the time of a rapid fluctuation in the input voltage or a sudden change in the load is substantially the same as that when the input voltage is placed. For example, when the input voltage increases rapidly or the load is reduced rapidly during the steady-state operation, the output voltage increases and, as a result, the output voltage signal Vo and the output differential signal Vd do not satisfy the relationship defined by Formula 1 temporarily. When the output voltage signal Vo increases and the difference between the output voltage signal Vo and the target value Vref becomes large, the duty ratio δ(k) calculated by Formula 11 decreases below the ON-duration minimum duty ratio δmin (e.g., a negative value). The drive pulse generation means 32 uniformly outputs the drive pulse V14 of the minimum duty ratio δmin (e.g., zero %) when the calculated duty ratio δ(k) is smaller than the minimum duty ratio δmin. Accordingly, the switching power supply unit 10 tries to decrease the output voltage rapidly in, for example, a duration immediately after a duration in which the input voltage increases rapidly by operating uniformly at the minimum duty ratio δmin and restricting the power supply from the input side to the minimum.

As the difference between the output voltage signal Vo and the target value Vref becomes smaller, and the duty ratio δ(k) calculated by Formula 11 becomes equal to or greater than the ON-duration minimum duty ratio δmin, the drive pulse generation means 32 outputs the drive pulse V14 of duty ratio δ(k) and drives the main switching element 14. Then, as the output voltage signal Vo and the output differential signal Vd change along the dashed line in the graph and the difference between the output voltage signal Vo and the target value Vref is eliminated, the switching power supply unit 10 performs the steady-state operation illustrated in FIGS. 2 and 3.

In the switching power supply unit 10, as described above, Formula 1 as a control function formula is defined in the calculation means 30 of the control circuit 24, and the switching power supply unit 10 includes, as parameters, the output voltage and the output differential value which represents a fluctuation in the output voltage and provides a predetermined relationship via the target value Vref of the output voltage. The calculation means 30 calculates the duty ratio δ used for the determination of the ON and OFF durations by Formula 11 derived through the substitution of the input voltage signal Vi, the output voltage signal Vo and the output differential signal Vd such that Formula 1 might be satisfied. Accordingly, when the input voltage or the output voltage fluctuates rapidly, the information regarding the rapid fluctuation will be immediately reflected in the calculation and, as a result, a response to the rapid fluctuation in the input voltage or the sudden change in the load is rapidly made. When the duty ratio δ calculated by Formula 11 is not in the range between the minimum duty ratio δmin and the maximum duty ratio δmax, the duty ratio of the main switching element in the ON duration is uniformly set to the minimum duty ratio δmin or the maximum duty ratio δmax and the controlled variable for reducing a deviation between the output voltage and the target value becomes the maximum instantaneously.

Since the duty ratio δ(k) calculated by the calculation means 30 changes such that the output voltage signal Vo and the output differential signal Vd might satisfy a linear relationship of Formula 1, neither transient overshoot nor vibration occurs in the output voltage in the process until the output voltage reaches the predetermined target value Vref and the steady-state operation is started (e.g., the durations A and B in FIG. 4).

A way of the fluctuation in, for example, the output voltage when the input voltage is placed can be adjusted easily by changing the control function formula of Formula 1. For example, if the coefficient s in Formula 1 is changed to a relatively large value, the slope of the dashed line in FIG. 4A becomes gentle and thus the duration A will be terminated in a shorter time. As a result, a peak value of the capacitor current (corresponding to Ic) becomes smaller and thus stress to the electronic component is reduced. At the same time, a rate of the increase of the output voltage becomes low and the duration B is prolonged and thus the starting time of the switching power supply unit 10 becomes long.

It is also possible to add conditions to Formula 1 such that the output differential value Vd becomes a constant value Vdd in a range in which the difference between the output voltage signal Vo and the target value Vref exceeds E. Control function formulae in that case are given by Formulae 12 to 14.

[Formula 12]
$$Vd = +Vdd = \frac{\varepsilon}{s}[Vo \leq Vref - \varepsilon] \quad (12)$$

[Formula 13]
$$Vd = \frac{1}{s}(Vo - Vref)[Vref - \varepsilon < Vo < Vref + \varepsilon] \quad (13)$$

[Formula 14]
$$Vd = Vdd = -\frac{\varepsilon}{s}[Vo \geq Vref + \varepsilon] \quad (14)$$

Figure 5A:
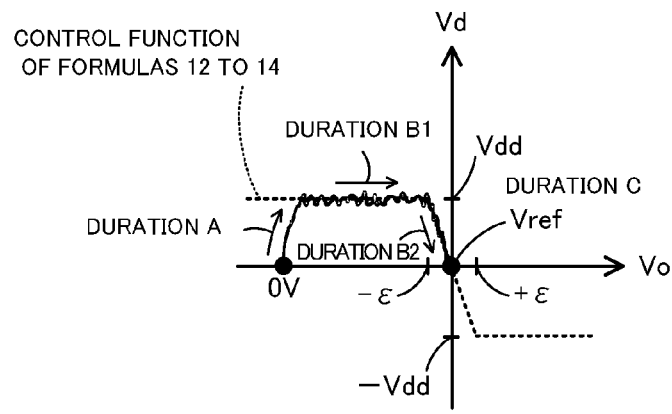
FIG. 5A is a graph of a variant example of the control function formula of FIG. 4A.
Figure 5B:
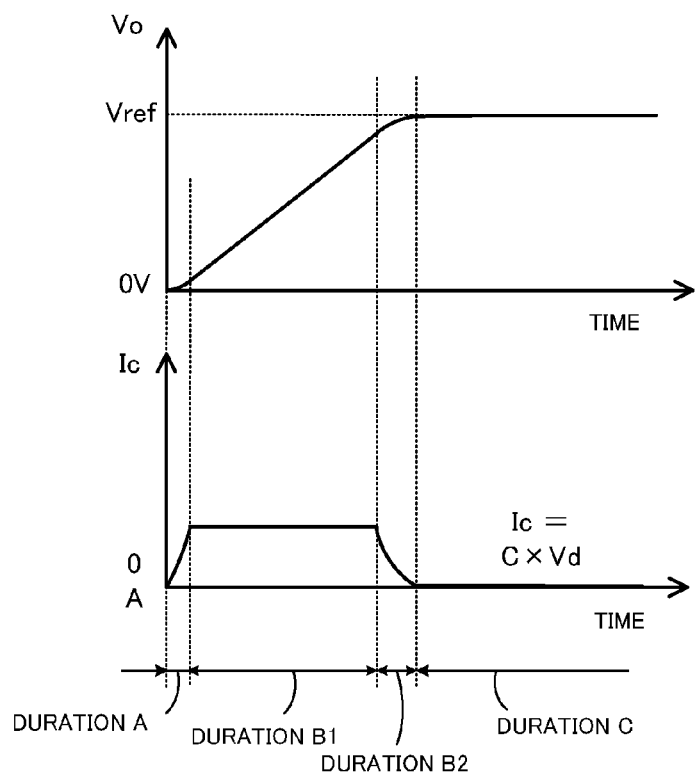
FIG. 5B is a timing diagram illustrating an operation in the variant example.

When these control function formulae of Formulae 12 to 14 are defined in the calculation means 30, three calculation formulae of the duty ratio δ(k) corresponding to Formula 11 are available. Among these, a calculation formula is selected depending on the value of the output voltage signal Vo. As illustrated in FIGS. 5A and 5B, since the duty ratio δ(k) obtained by one of the corresponding calculation formulae exceeds the ON-duration maximum duty ratio δmax in the duration A immediately after an input voltage is placed, the drive pulse generation means 32 uniformly outputs the drive pulse V14 of the maximum duty ratio. The relationship between the output voltage signal Vo and the output differential signal Vd reaches the dashed line which represents Formulae 12 to 14 in a short time and a duration B1 begins. Thus, the peak value of the capacitor current (corresponding to Ic) can be reduced to a smaller value.

In the durations B1 and B2, a calculation formula corresponding to each duration is selected and the duty ratio δ(k) is calculated from the selected calculation formula. Since the obtained duty ratio δ(k) is equal to or smaller than the maximum duty ratio δmax, the drive pulse generation means 32 outputs the drive pulse V14 of the duty ratio δ(k) and drives the main switching element 14. Thus, the relationship between the output voltage signal Vo and the output differential signal Vd changes along the dashed line in the graph. In the duration C, a difference between the output voltage signal Vo and the target value Vref is eliminated and the steady-state operation illustrated in FIGS. 2 and 3 is started.

The lengths of the durations B1 and B2 can be shortened while reducing the peak value of the capacitor current by adjusting the coefficient s in Formula 13. For example, when the coefficient s is set to a small value, the total length of the durations B1 and B2 may be equal to that of the duration B illustrated in FIG. 4. That is, by applying Formulae 12 to 14 instead of Formula 1 as the control function formulae, the starting time of the switching power supply unit 10 and the peak value of the capacitor current can be adjusted independently.

Figure 6:
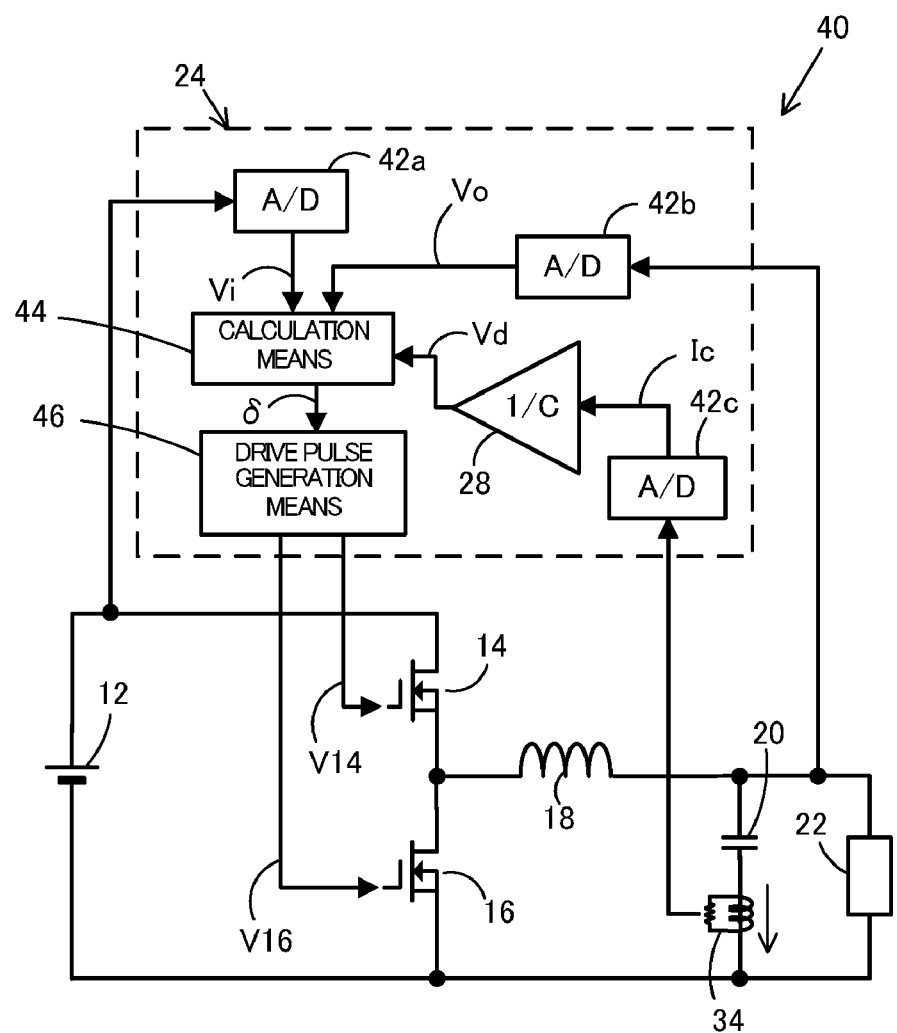
FIG. 6 is a circuit diagram of a switching power supply unit according to a second embodiment of the present invention.
Figure 7:
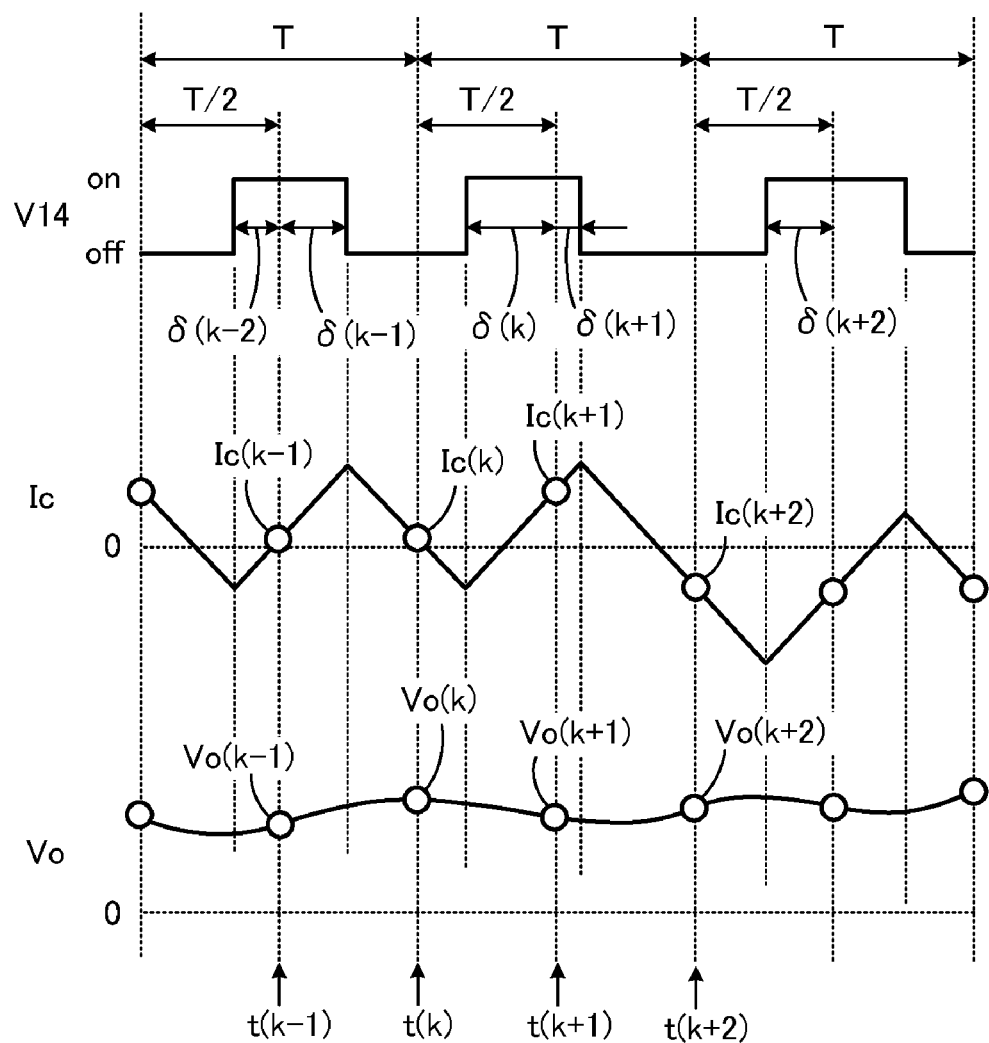
FIG. 7 is a timing diagram illustrating a steady-state operation of the second embodiment of the present invention.

Next, a switching power supply unit 40 according to a second embodiment of the present invention will be described with reference to FIGS. 6 and 7. Components similar to those of the above-described switching power supply unit 10 will be denoted by similar reference numerals and description thereof will be omitted. The switching power supply unit 40 has a configuration substantially similar to that of the switching power supply unit 10 illustrated in FIG. 1 except that the switching power supply unit 40 includes A/D converters 42a, 42b and 42c, a calculation means 44 and a drive pulse generation means 46 instead of the A/D converters 26a, 26b and 26c, the calculation means 30 and the drive pulse generation means 32. The A/D converters 42a, 42b and 42c, the calculation means 44 and the drive pulse generation means 46 behave differently from the A/D converters 26a, 26b and 26c, the calculation means 30 and the drive pulse generation means 32, respectively.

Analog information from each component is input to the A/D converters 42a, 42b and 42c, which sample the information at predetermined time instants and respectively output an input voltage signal Vi, an output voltage signal Vo and a capacitor current signal Ic which have been converted into digital information. The sampling is performed for each half of the cycle of switching of a main switching element 14. The sampling is performed at arbitrary time instants in the ON duration of the main switching element 14 and in a duration in which a smoothing inductor 18 is releasing, to the output side, excitation energy accumulated in the ON duration. Here, the state of "releasing excitation energy to the output side" includes a state in which a current which releases excitation energy is flowing also from the output side toward the smoothing inductor 18.

A control function formula of Formula 1 is defined in the calculation means 44 as in the above-described calculation means 30. However, unlike the calculation means 30, the calculation means 44 samples the input voltage signal Vi, the output voltage signal Vo and the output differential signal Vd, which are input from the above-described A/D converters 42a and 42b and a conversion means 28, at predetermined time instants for each half of the cycle of switching described above. The calculation means 44 then calculates Formula 11 based on these three signals to obtain a duty ratio δ of the duration until the next time instant for sampling.

The drive pulse generation means 46 generates a drive pulse V14 for the main switching element 14 and a drive pulse V16 for a rectifier 16 based on the duty ratio δ determined by the calculation means 44. However, unlike the drive pulse V14 generated by the drive pulse generation means 32, the drive pulse V14 generated by the drive pulse generation means 46 is a pulse voltage in which durations before and after a second time instant for sampling in one cycle of switching T is set to be ON durations of the main switching element 14. In the duration with the duty ratio δ, the drive pulse V14 is at a high level at which the main switching element 14 is turned on and is at a low level in other durations. The drive pulse V16 is a pulse voltage in the reverse phase with and in synchronization with the drive pulse V14. The drive pulse V16 is at a low level in the duration with the duty ratio δ and is at a high level in other durations in which the rectifier 16 is turned on.

With the calculation means 44 and the drive pulse generation means 46, when the output differential value Vd (or the capacitor current signal Ic) is sampled in a duration in which no current is flowing through the smoothing inductor 18 (i.e., a zero current duration), control of the output using the output differential value Vd becomes impossible. However, as in the switching power supply unit 10 according to the first embodiment, since the main switching element 14 and the rectifier 16 of the switching power supply unit 40 are bidirectionally conductive N-channel MOSFETs, even if, for example, the output current supplied to the load 22 is reduced to a critical point or below a critical point at which the current stops flowing in the circuit, the smoothing inductor 18 causes the current to continuously flow and thus the zero current duration does not appear. Accordingly, sampling can be performed at arbitrary time instants in the cycle of switching T.

Hereinafter, an operation of the switching power supply unit 40 will be described. A flowchart which illustrates a steady-state operation after an input voltage is placed is the same as that of FIG. 2 described with reference to the above-described switching power supply unit 10. Thus, as illustrated in a timing diagram of FIG. 7, the duty ratio δ is variably adjusted for each half of the cycle of switching T. Accordingly, since the duty ratio δ is adjusted two times as often as in the above-described switching power supply unit 10 and the control delay in the output voltage is reduced by half, the response of the control is even more accelerated. Further, the transient operation of the switching power supply unit 40 in response to, for example, a rapid fluctuation in the input voltage or a sudden change in the load is substantially the same as the operation of the above-described switching power supply unit 10 and thus neither transient overshoot nor vibration occurs in response to a fluctuation in the output voltage.

Figure 8:
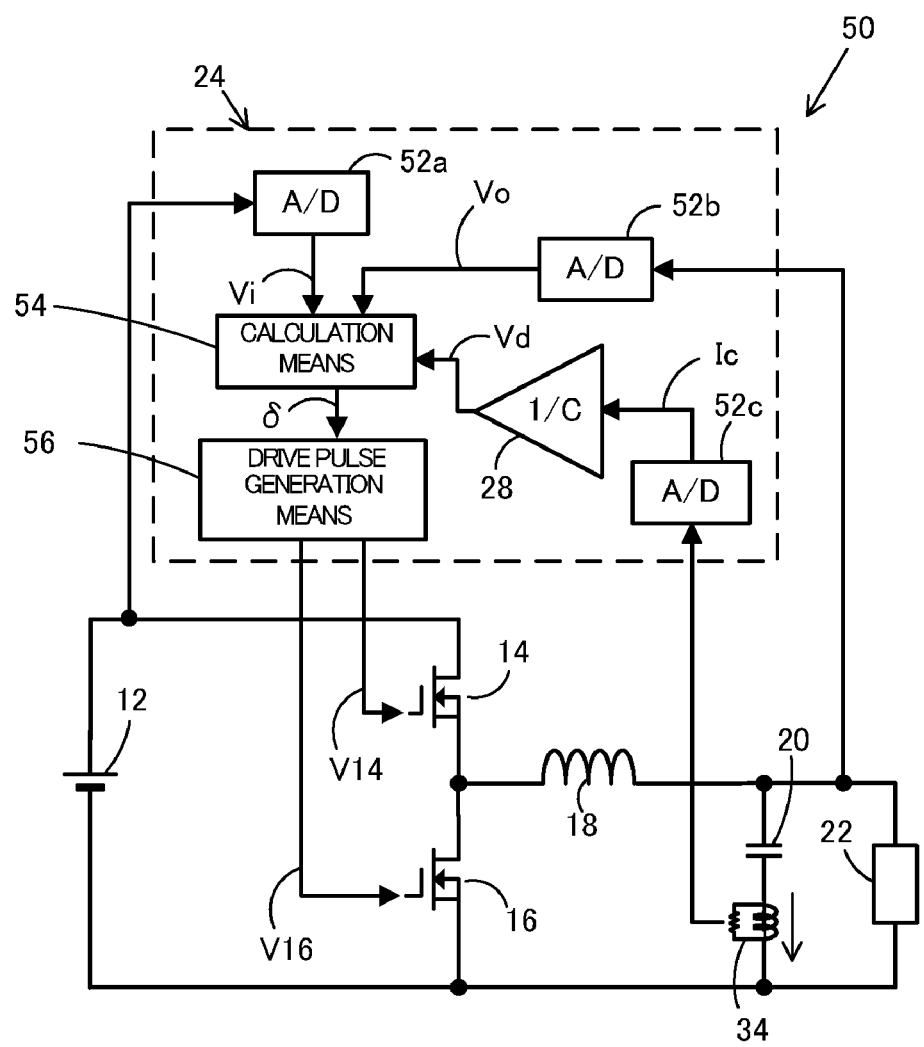
FIG. 8 is a circuit diagram of a switching power supply unit according to a third embodiment of the present invention.

Next, a switching power supply unit 50 according to a third embodiment of the present invention will be described with reference to FIGS. 8 to 10. Components similar to those of the above-described switching power supply unit 10 will be denoted by similar reference numerals and description thereof will be omitted. The switching power supply unit 50 has a configuration substantially similar to that of the switching power supply unit 10 illustrated in FIG. 1 except that the switching power supply unit 50 includes A/D converters 52a, 52b and 52c, a calculation means 54 and a drive pulse generation means 56 instead of the A/D converters 26a, 26b and 26c, the calculation means 30 and the drive pulse generation means 32. The A/D converters 52a, 52b and 52c, the calculation means 54 and the drive pulse generation means 56 behave differently from the A/D converters 26a, 26b and 26c, the calculation means 30 and the drive pulse generation means 32, respectively.

Analog information from each component is input to the A/D converters 52a, 52b and 52c, which sample the information at predetermined time instants and respectively output an input voltage signal Vi, an output voltage signal Vo and a capacitor current signal Ic which have been converted into digital information. The sampling is performed for each cycle of switching of a main switching element 14. The sampling is performed at time instants at which the main switching element 14 is turned on.

A control function formula of Formula 1 is defined in the calculation means 54 as in the above-described calculation means 30. However, unlike the calculation means 30, the input voltage signal Vi input from the A/D converter 52a, the output voltage signal Vo input from the A/D converter 52b and the output differential signal Vd input from a conversion means 28 are sampled at the time instants at which the main switching element 14 is turned on in each cycle of switching described above. A predetermined operation is performed based on these three signals and a duty ratio δ is obtained.

Since the control circuit 24 of the switching power supply unit 50 is constituted by a relatively inexpensive and general-purpose digital IC, the time required for, for example, the calculation performed by the calculation means 54 cannot be ignored. Accordingly, the duty ratio δ of the duration after the next time instant for sampling is calculated with the calculation means 54 while the duty ratio δ in the duration until the next time instant for sampling is calculated with the above-described calculation means 30 which is constituted by, for example, a digital IC that is capable of high speed calculation. Here, the ON-duration duty ratio δ is calculated under the conditions that the total of the ON and OFF durations might be kept constant and that certain PWM control might be performed on the cycle of switching.

The drive pulse generation means 56 generates a drive pulse V14 for the main switching element 14 and a drive pulse V16 for a rectifier 16 based on the duty ratio δ determined by the calculation means 54. However, unlike the drive pulse V14 generated by the drive pulse generation means 32, the drive pulse V14 generated by the drive pulse generation means 56 is a pulse voltage in which a duration with the duty ratio δ starting at the time instant for sampling is set to be an ON duration of the main switching element 14. In the duration with the duty ratio δ, the drive pulse V14 is at a high level at which the main switching element 14 is turned on and is at a low level in other durations. The drive pulse V16 is a pulse voltage in the reverse phase with and in synchronization with the drive pulse V14. The drive pulse V16 is at a low level in the duration with the duty ratio δ and is at a high level in other durations in which the rectifier 16 is turned on.

Hereinafter, an operation of the switching power supply unit 50 will be described. FIG. 10 illustrates a steady-state operation of the switching power supply unit 50 after an input is placed. The cycle in which the calculation means 30 samples each signal is T, which is the same as the cycle of switching, and the sampling is performed at time instants of t(k−1), t(k), t(k+1) and t(k+2) for each cycle of sampling T at which the main switching element 14 is turned on.

Figure 9:
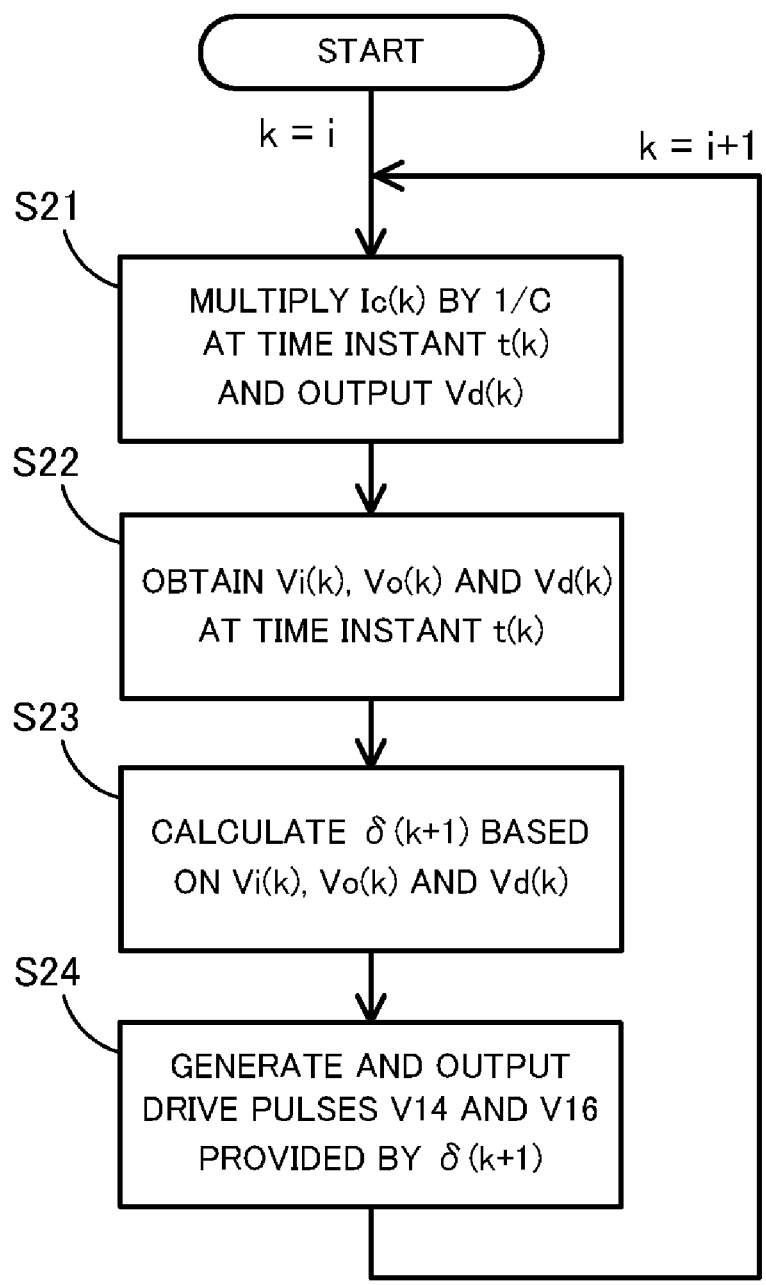
FIG. 9 is a flowchart illustrating a steady-state operation according to the third embodiment of the present invention.

First, as illustrated in FIG. 9, at the time instant t(k), the conversion means 28 divides a capacitor current signal Ic(k) by capacity C of the smoothing capacitor 20 and outputs an output differential signal Vd(k) (step S21). At the same time instant t(k), the calculation means 30 samples an input voltage signal Vi(k), an output voltage signal Vo(k) and an output differential signal Vd(k) (step S22). Next, a predetermined calculation is performed to obtain the next duty ratio δ(k+1) after the next time instant t(k+1) for sampling (step 23).

Based on the input voltage signal Vi(k), the output voltage signal Vo(k) and the output differential signal Vd(k), the calculation means 54 calculates the duty ratio δ(k+1) after the sampling t(k+1) such that a relationship between the output voltage Vo which is to be detected at the time instant t(k+2) for sampling after the next time and the output differential signal Vd might satisfy Formula 1. Accordingly, the calculation means 54 performs a calculation different from that of Formula 11. Although description of calculation formulae for the calculation is omitted, such calculation formulae can be derived from a similar point of view to that in Formulae 2 to 11. Since the sampling is performed at the time instants at which the main switching element 14 is turned on, an amplitude component for each cycle of switching of the capacitor current can be a cause of a deviation in the setting of the output voltage. Thus, the calculation formulae should be derived while considering this fact.

Next, the drive pulse generation means 56 generates the drive pulse V14 and the drive pulse V16 after the time instant t(k+1) based on the duty ratio δ(k+1) determined in step S23 (step S24). Since the drive pulse V14 is set such that the duration with the duty ratio δ(k+1) might start at the time instant t(k+1), the drive pulse V14 is at a high level at which the main switching element 14 is turned on. The drive pulse V16 is a pulse voltage in the reverse phase with the drive pulse V14 and is at a low level in the duration with the duty ratio δ(k) in which the rectifier 16 is turned off.

Figure 10:
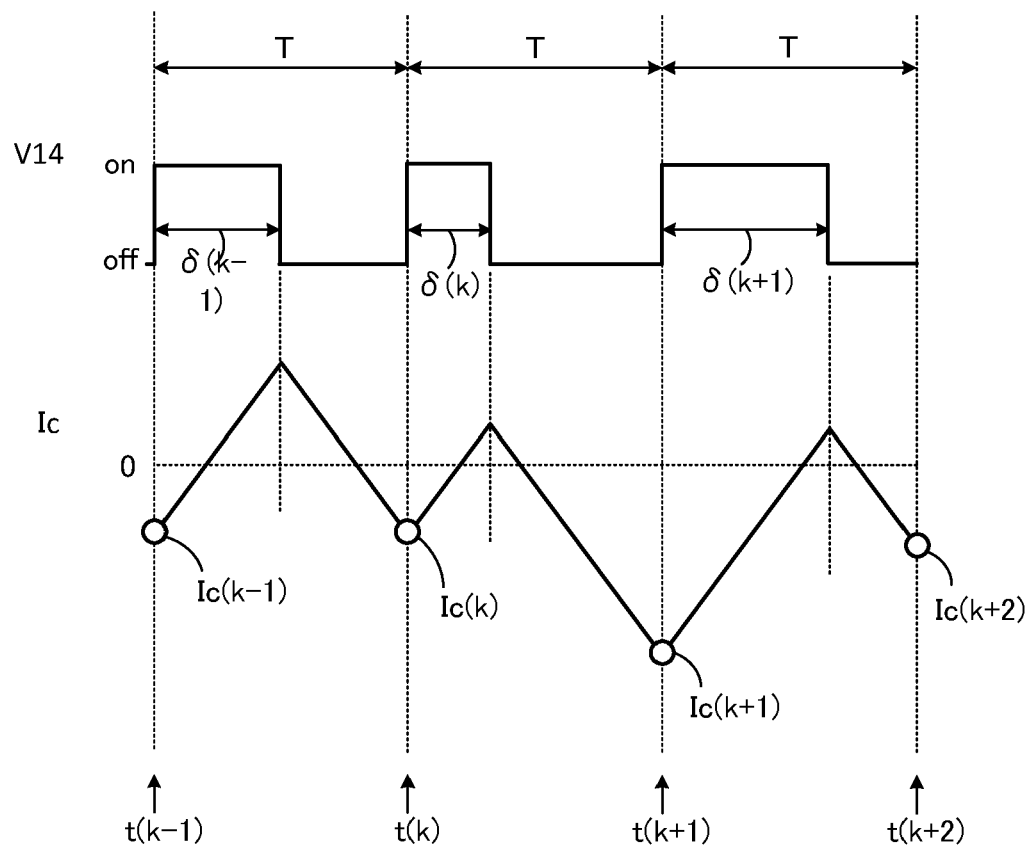
FIG. 10 is a timing diagram illustrating the steady-state operation according to third embodiment of the present invention.

A PWM control is performed on the switching power supply unit 50 which operates as illustrated in FIG. 10 by repeating steps S21 to S24 such that the output voltage might be equal to the target value Vref. Since the calculation means 54 calculates the duty ratio δ after the next time instant for sampling, the calculation means 54 has a time-lag for one cycle of switching to the control operation as compared with the above-described switching power supply unit 10. However, the sufficiently practical response speed is provided. Further, the transient operation of the switching power supply unit 50 in response to, for example, a rapid fluctuation in the input voltage or a sudden change in the load is substantially the same as the operation of the above-described switching power supply unit 10 and thus neither transient overshoot vibration occurs in response to a fluctuation in the output voltage. Thus, the switching power supply unit 50 can constitute the control circuit 24 with an excellent control property even with a relatively inexpensive medium and low speed digital IC.

Figure 11:
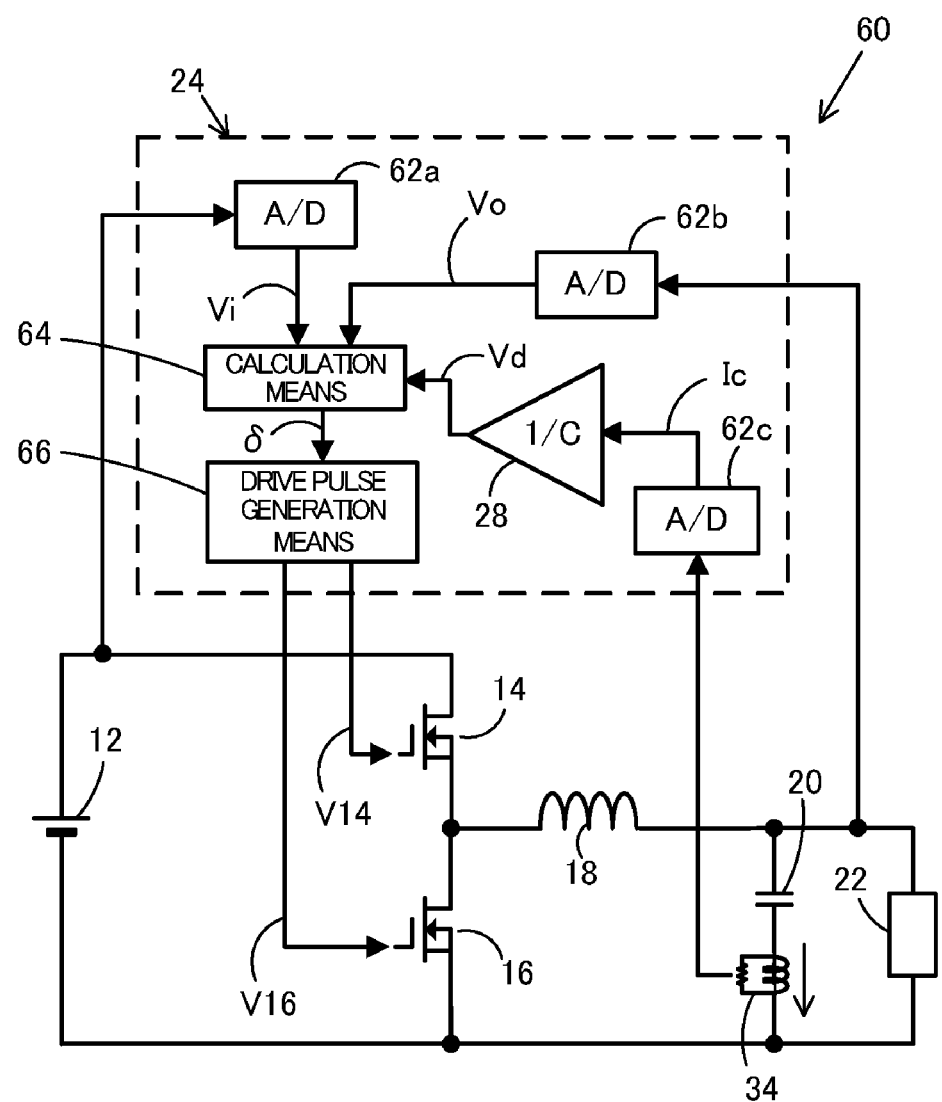
FIG. 11 is a circuit diagram of a switching power supply unit according to a fourth embodiment of the present invention.
Figure 12:
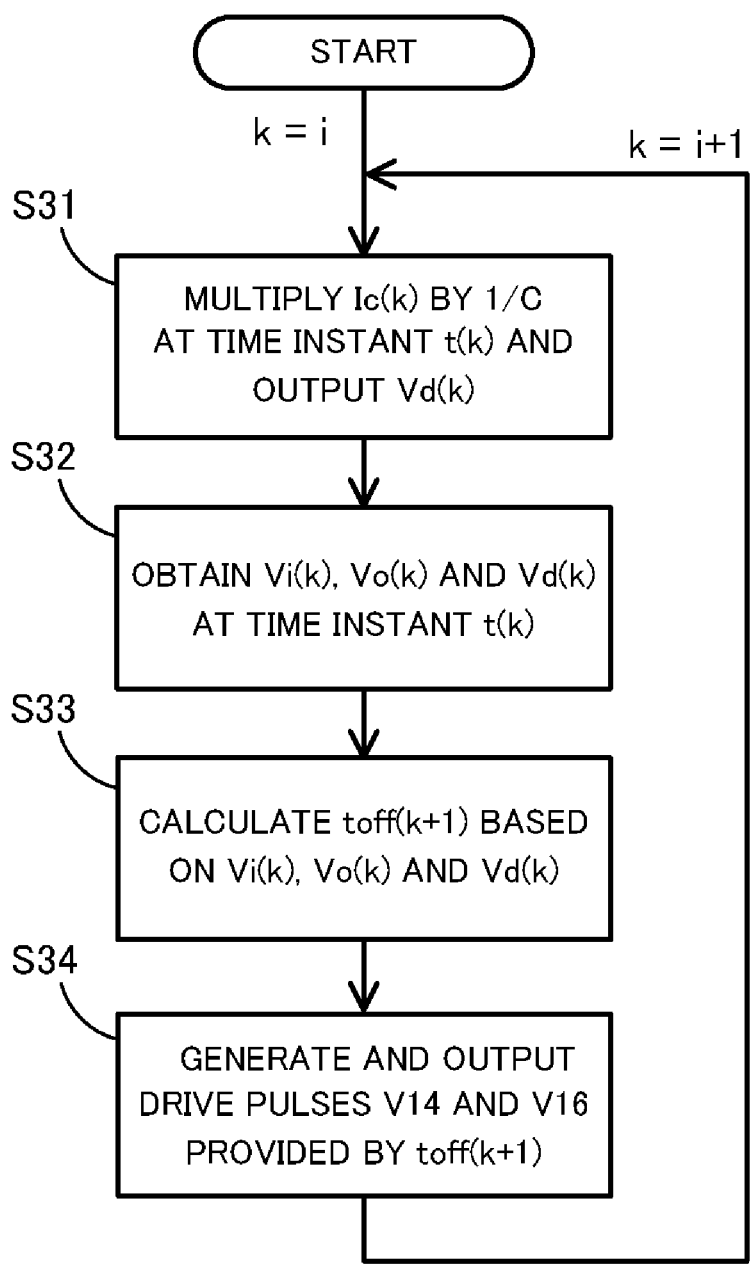
FIG. 12 is a flowchart illustrating a steady-state operation according to a fourth embodiment of the present invention.

Next, a switching power supply unit 60 according to a fourth embodiment of the present invention will be described with reference to FIGS. 11 to 13. Components similar to those of the above-described switching power supply unit 10 will be denoted by similar reference numerals and description thereof will be omitted. The switching power supply unit 60 has a configuration almost similar to that of the switching power supply unit 10 illustrated in FIG. 1 except that the switching power supply unit 60 includes A/D converters 62a, 62b and 62c, a calculation means 64 and a drive pulse generation means 66 instead of the A/D converters 26a, 26b and 26c, the calculation means 30 and the drive pulse generation means 32. The A/D converters 62a, 62b and 62c, the calculation means 64 and the drive pulse generation means 66 behave differently from the A/D converters 26a, 26b and 26c, the calculation means 30 and the drive pulse generation means 32, respectively.

Analog information from each component is input to the A/D converters 62a, 62b and 62c, which sample the information at predetermined time instants and respectively output an input voltage signal Vi, an output voltage signal Vo and a capacitor current signal Ic which have been converted into digital information. The sampling is performed for each cycle of switching of a main switching element 14. The sampling is performed at time instants in synchronization with a cycle of switching of the main switching element 14, i.e., at predetermined time instants in the ON duration of the main switching element 14 or a duration in which a smoothing inductor 18 is releasing the excitation energy. However, the cycle of switching determined by the calculation means 64 varies as described later.

A control function formula of Formula 1 is defined in the calculation means 64 as in the above-described calculation means 30. An input voltage signal Vi from the A/D converter 62a, an output voltage signal Vo from the A/D converter 62b and an output differential signal Vd from the conversion means 28 are sampled at the time instants described above. The calculation means 64 performs a predetermined calculation based on these three signals and obtains the ON and OFF durations.

Since the control circuit 24 of the switching power supply unit 60 is constituted by a relatively inexpensive and general-purpose digital IC, the time required for, for example, the calculation performed by the calculation means 64 cannot be ignored. Accordingly, the calculation means 64 calculates the ON and OFF durations of the main switching element 14 after the next time instant for sampling based on the above-described three signals and calculates the OFF duration such that the PFM control might be performed with the ON duration being constant. Accordingly, the cycle of switching and the cycle of sampling vary.

The drive pulse generation means 66 generates a drive pulse V14 and a drive pulse V16 based on the ON and OFF durations determined by the calculation means 64. In the drive pulse V14, the same durations are set before and after the midpoint of the cycle of sampling as the ON duration of the main switching element 14. The drive pulse V14 is at a high level in that duration and is at a low level in other durations. The drive pulse V16 is a pulse voltage in the reverse phase with and in synchronization with the drive pulse V14. The drive pulse V16 is at a low level in the ON duration in which the rectifier 16 is turned off and is at a high level in other durations.

Hereinafter, an operation of the switching power supply unit 60 will be described. FIG. 13 illustrates a steady-state operation of the switching power supply unit 60 after an input voltage is placed. The cycle in which the calculation means 64 samples each signal changes in the order of T(k−1), T(k) and T(k+1) in synchronization with the cycle of switching. Sampling is performed at time instants for sampling of t(k−1), t(k), t(k+1) and t(k+2).

First, at the time instant t(k), the conversion means 28 divides a capacitor current signal Ic(k) by capacity C of the smoothing capacitor 20 and outputs an output differential signal Vd(k) (step S31). At the same time instant t(k), the calculation means 30 samples an input voltage signal Vi(k), an output voltage signal Vo(k) and an output differential signal Vd(k) (step S32). Next, a predetermined calculation is performed to obtain the OFF duration toff(k+1) after the next time instant t(k+1) for sampling (step 33).

Based on the input voltage signal Vi(k), the output voltage signal Vo(k) and the output differential signal Vd(k), the calculation means 64 calculates the OFF duration toff(k+1) such that a relationship between the output voltage Vo which is to be detected at the next time instant t(k+2) for sampling and the output differential signal Vd might satisfy Formula 1. Although description of calculation formulae for the calculation is omitted, such calculation formulae can be derived from a similar point of view to that in Formulae 2 to 11.

Next, the drive pulse generation means 66 generates the drive pulse V14 and the drive pulse V16 after the time instant t(k+1) based on the OFF duration toff(k+1) determined in step S33 and the ON duration ton which is a fixed value (step S34). In the drive pulse V14, the same durations are set before and after the midpoint of the sampling period T(k+1) as the duration of the ON duration ton. In the ON duration ton, the drive pulse V14 is at a high level at which the main switching element 14 is turned on. Durations each half the OFF duration toff(k+1) are set before and after the ON duration ton and the drive pulse V14 is at a low level in the durations at which the main switching element 14 is turned off. The drive pulse V16 is a pulse voltage in the reverse phase with the drive pulse V14 and is at a low level in the ON duration ton and is at a high level in the halves of the duration of toff(k+1) before and after the ON duration at which the rectifier 16 is turned on.

Figure 13:
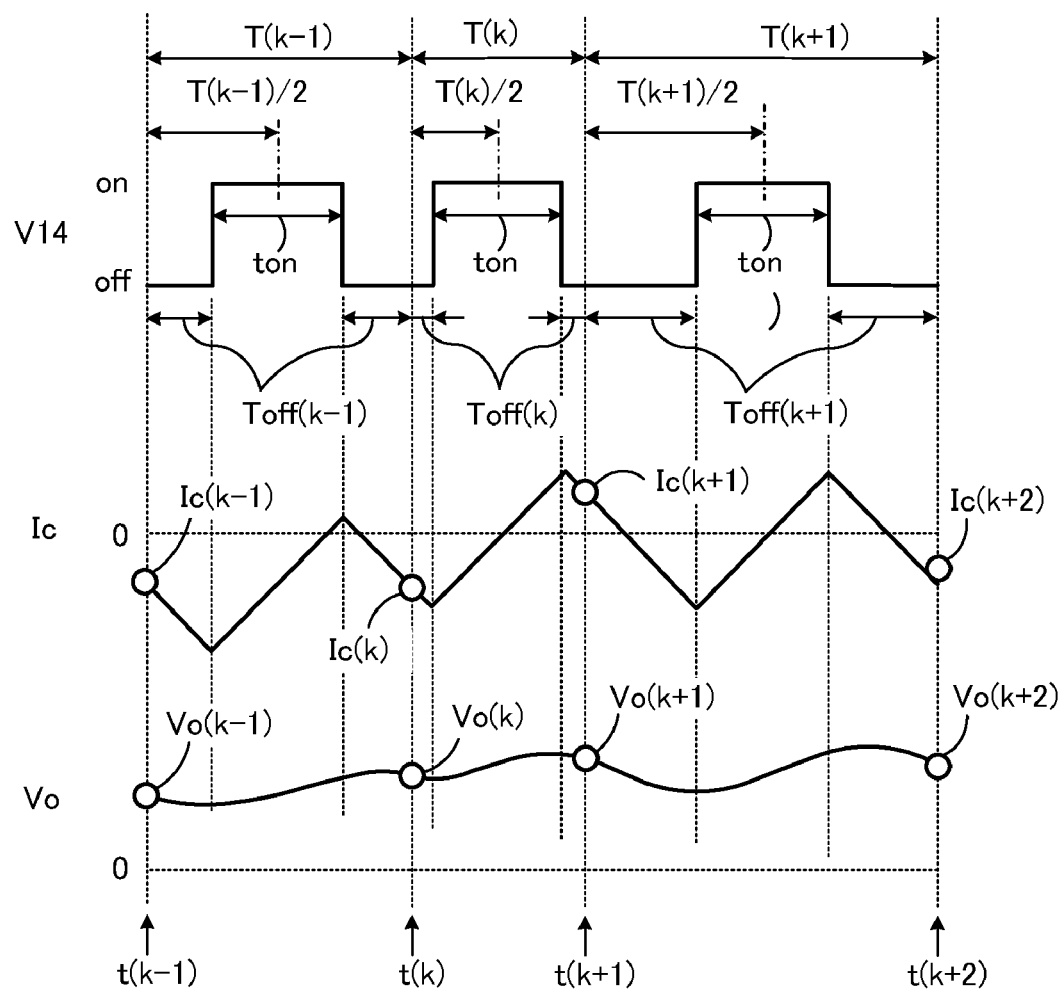
FIG. 13 is a timing diagram illustrating a normal operation according to the fourth embodiment of the present invention.

A PFM control is performed on the switching power supply unit 60 which operates as illustrated in FIG. 13 by repeating steps S31 to S34 such that the output voltage might be equal to the target value Vref. Since the switching power supply unit 60 calculates the OFF duration 5 after the next time instant for sampling, the calculation means 64 has a time-lag for one cycle of switching to the control operation as compared with the above-described switching power supply unit 10. However, the sufficiently practical response speed is provided. Further, the transient operation of the switching power supply unit 40 in response to, for example, a rapid fluctuation in the input voltage or a sudden change in the load is substantially the same as the operation of the above-described switching power supply unit 10 and thus neither transient overshoot nor vibration occurs in response to a fluctuation in the output voltage. Thus, the switching power supply unit 60 can constitute the control circuit 24 with an excellent control property even with a relatively inexpensive medium and low speed digital IC.

Figure 14:
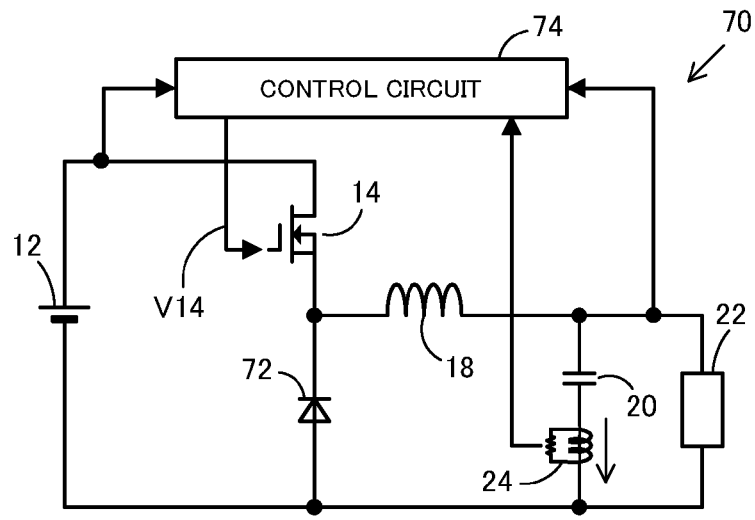
FIG. 14 is a circuit diagram of a switching power supply unit according to a fifth embodiment of the present invention.

Next, a switching power supply unit 70 according to a fifth embodiment of the present invention will be described with reference to FIG. 14. In the description, components similar to those of the switching power supply unit 50 according to the third embodiment will be denoted by similar reference numerals. The switching power supply unit 70 is provided with a common step-down chopper power converter circuit as in the above-described switching power supply unit 50. In the power converter circuit, power is supplied to the output side load 22 from the input DC power supply 12 in an ON duration of a main switching element 14 and a built-in smoothing inductor 18 is excited by an input DC power supply 12. Excitation energy accumulated in the smoothing inductor 18 is released in an OFF duration of the main switching element 14 and the power is supplied to an output side load 22.

However, the switching power supply unit 70 includes, instead of the rectifier 16 of a MOSFET, a rectifier 72 which is a diode capable of conducting to a junction point from the ground to the main switching element 14 and the smoothing inductor 18, and the control circuit 74 provided instead of the control circuit 24 is constituted to only output the drive pulse 14. Since the conduction of the rectifier 72 is unidirectional, when the output current supplied to the load 22 is reduced to a critical point or below a critical point, the current flowing through the smoothing inductor 18 becomes non-continuous and zero current duration is produced.

In the control circuit 74, unlike the operation of the control circuit 24 of the above-described switching power supply unit 50, an unillustrated calculation means or other means calculates the duty ratio δ by sampling at time instants at which the main switching element 14 is turned off in each cycle of switching. Since this time instant for sampling is not in the zero current duration, the output control using the output differential value Vd does not become impossible. When a forward voltage during the conduction of the rectifier 16 cannot be ignored, it is preferable to reduce an error of the setting in the output voltage using the calculation formula in which the forward voltage is incorporated in Formula 11. Since Formula 11 does not hold when the output current is reduced to a critical point or below a critical point, the duty ratio δ is calculated based on a specific calculation formula which is different from Formula 11. An unillustrated drive pulse generation means generates the drive pulse V14 in which the duration starting with the time instant for sampling is set to be the OFF duration of the main switching element 14. Operations of the control circuit 74 other than that described above, i.e., calculating the duty ratio δ of the duration after the next time instant for sampling and calculating the duty ratio δ under certain conditions for the cycle of switching (performing the PWM control), are the same as those of the control circuit 24 of the switching power supply unit 50.

The thus-configured switching power supply unit 70 in which a diode is used as the rectifier 72 has the same advantageous effect as that of the above-described switching power supply unit 50. However, due to the existence of the "zero current duration," the switching power supply unit 70 cannot perform the operation similar to that of the switching power supply unit 40 according to the second embodiment illustrated in FIG. 6.

Figure 15:
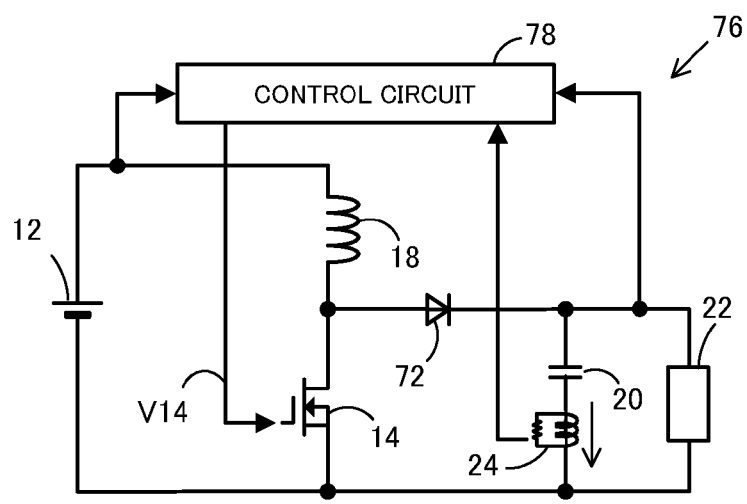
FIG. 15 is a circuit diagram of a switching power supply unit according to a sixth embodiment of the present invention.

Next, a switching power supply unit 76 according to a sixth embodiment of the present invention will be described with reference to FIG. 15. In the description, components similar to those of the switching power supply unit 70 will be denoted by similar reference numerals. Unlike the switching power supply unit 70 described above, the switching power supply unit 76 is provided with a common step-up chopper power converter circuit. In the power converter circuit, power supply to an output side load 22 from the input DC power supply 12 is stopped in an ON duration of a main switching element 14 and a built-in smoothing inductor 18 is excited by an input DC power supply 12. In the OFF duration of the main switching element 14, excitation energy accumulated in the smoothing inductor 18 is released to the output side via the rectifier 72 and power is supplied to the load 22. In the OFF duration of the main switching element 14, power is also supplied from the input DC power supply 12 to the output side load 22.

The switching power supply unit 76 differs from the above-described switching power supply unit 70 in that the power supply from the input DC power supply 12 to the output side load 22 is stopped in the ON duration of the main switching element 14. Accordingly, the control of the output will become impossible unless the time instants at which the calculation means or other means of the later-described control circuit 78 performs sampling are set in the OFF duration of the main switching element 14. Since the conduction of the rectifier 72 is unidirectional, when the output current supplied to the load 22 is reduced to a critical point or below a critical point, the current flowing through the smoothing inductor 18 becomes non-continuous and zero current duration is produced. Accordingly, it is necessary to set the time instant for sampling in a duration other than the above-described zero current duration.

In the control circuit 78, in order to avoid the uncontrollability of the output, an unillustrated calculation means or other means samples at the time instant immediately after the main switching element 14 is turned off in each cycle of switching of the main switching element 14 (i.e., in a state in which the smoothing inductor 18 is releasing excitation energy) and an unillustrated drive pulse generation means generates a drive pulse V14 in which a duration starting from immediately before the time instant for sampling is set to be the OFF duration of the main switching element 14. The calculation performed by the calculation means is represented by a calculation formula specific to a step-up chopper which is different from, for example, Formula 11 which is specific to a step-down chopper. Since an amplitude component for each cycle of switching of the capacitor current can be a cause of a deviation in the setting of the output voltage, the calculation formulae should be derived while considering this fact. Operations of the control circuit 78 other than that described above, i.e., calculating the duty ratio δ of the duration after the next time instant for sampling and calculating the duty ratio δ under certain conditions for the cycle of switching (performing the PWM control), are the same as those of the control circuit 74 of the switching power supply unit 70.

The thus-configured switching power supply unit 76 in which a step-up chopper power converter circuit is employed and a diode is used as the rectifier 72 has the same advantageous effect as that of the above-described switching power supply unit 50.

Figure 16:
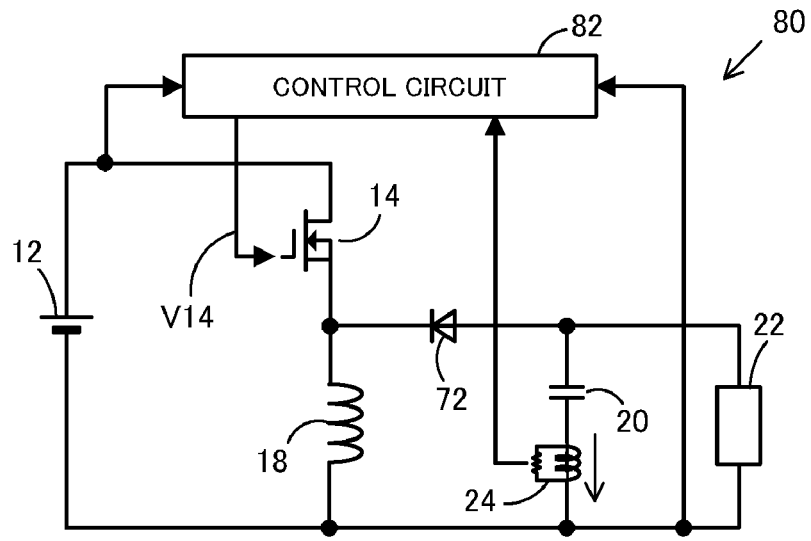
FIG. 16 is a circuit diagram of a switching power supply unit according to a seventh embodiment of the present invention.

Next, a switching power supply unit 80 according to a seventh embodiment of the present invention will be described with reference to FIG. 16. In the description, components similar to those of the switching power supply unit 76 will be denoted by similar reference numerals. Unlike the switching power supply unit 76 described above, the switching power supply unit 80 is provided with a common step-up and step-down chopper power converter circuit. In the power converter circuit, power supply to an output side load 22 from an input DC power supply 12 is stopped in an ON duration of a main switching element 14 and a built-in smoothing inductor 18 is excited by the input DC power supply 12. In the OFF duration of the main switching element 14, excitation energy accumulated in the smoothing inductor 18 is released to the output side via the rectifier 72 and power is supplied to the load 22.

The switching power supply unit 80 differs from the above-described switching power supply unit 76 in that the power supply from the input DC power supply 12 to the output side load 22 is stopped in the OFF duration of the main switching element 14. However, conditions for avoiding the uncontrollability of the output are the same as those of the switching power supply unit 76. In the later-described control circuit 82, the time instants at which the calculation means or other means performs sampling should be set in the OFF duration of the main switching element and, at the same time, in the duration other than the above-described zero current duration.

As in the control circuit 78 of the above-described switching power supply unit 76, in the control circuit 82, an unillustrated calculation means or other means performs sampling at a time instant immediately after the main switching element 14 is turned off in each cycle of switching of the main switching element 14 in order to avoid the uncontrollability of the output. An unillustrated drive pulse generation means generates a drive pulse V14 in which a duration starting from immediately before the time instant for sampling is set to be the OFF duration of the main switching element 14. Details of the calculation performed by the calculation means is represented by a calculation formula specific to a step-up and step-down chopper which is different from a calculation formula specific to a step-up chopper. Since an amplitude component for each cycle of switching of the capacitor current can be a cause of a deviation in the setting of the output voltage, the calculation formulae should be derived while considering this fact.

The thus-configured switching power supply unit 80 provided with a step-up and step-down chopper power converter circuit has the same advantageous effect as that of the above-described switching power supply unit 76.

Figure 17:
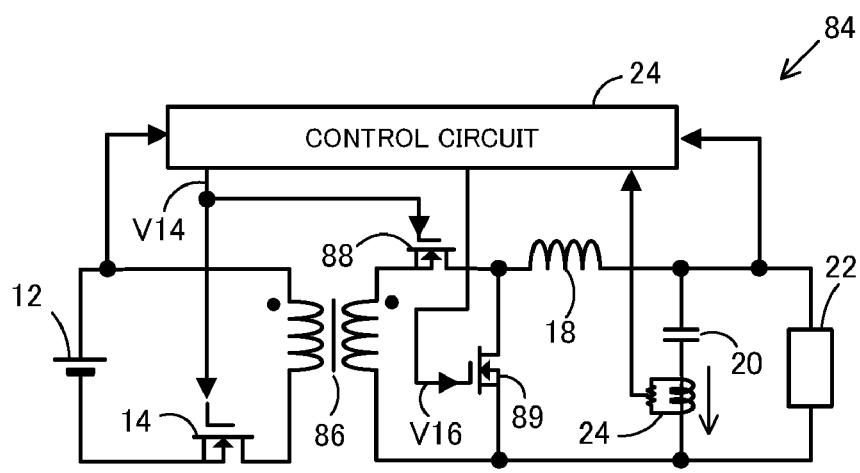
FIG. 17 is a circuit diagram of a switching power supply unit according to an eighth embodiment of the present invention.

Next, a switching power supply unit 84 according to an eighth embodiment of the present invention will be described with reference to FIG. 17. In the description, components similar to those of the switching power supply unit 10 according to the first embodiment will be denoted by similar reference numerals. The switching power supply unit 84 includes a single-ended forward power converter circuit configured by adding a transformer 86, a rectification side synchronous rectifier 88 and a commutation side synchronous rectifier 89 to the power converter circuit of the above-described switching power supply unit 10. This power converter circuit supplies power to an output side load 22 from an input DC power supply 12 via the transformer 86 and the rectification side synchronous rectifier 88 in an ON duration of a main switching element 14. The power converter circuit excites a smoothing inductor 18 with the input DC power supply 12 to release excitation energy accumulated in the smoothing inductor 18 in the OFF duration of the main switching element 14 to continuously supply the power to the output side load 22. Accordingly, the output voltage is controlled by the operation similar to that of the above-described switching power supply unit 10 by driving the rectification side synchronous rectifier 88 with a pulse voltage in the same phase as that of a drive pulse V14 of the main switching element 14 and driving the commutation side synchronous rectifier 89 with the drive pulse V16 in the reverse phase with the drive pulse V14.

The thus-configured switching power supply unit 84, which is provided with a single-ended forward power converter circuit and in which control is performed in the same manner as in the switching power supply unit 10 provided with a step-down chopper power converter circuit, has the same advantageous effect as that of the switching power supply unit 10.

Figure 18:
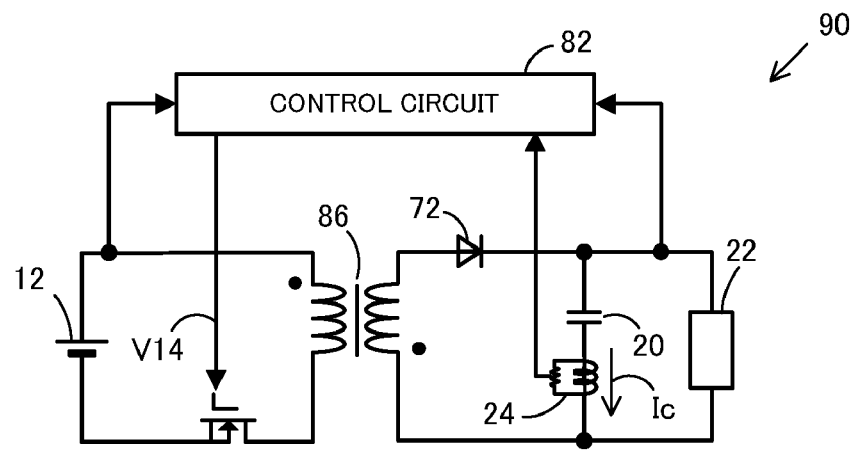
FIG. 18 is a circuit diagram of a switching power supply unit according to a ninth embodiment of the present invention.

Next, a switching power supply unit 90 according to a ninth embodiment of the present invention will be described with reference to FIG. 18. In the description, components similar to those of the switching power supply unit 80 according to the seventh embodiment will be denoted by similar reference numerals. The switching power supply unit 90 includes a flyback power converter circuit which is configured by adding a transformer 86 to the power converter circuit of the above-described switching power supply unit 80. In the power converter circuit, power supply to an output side load 22 from an input DC power supply 12 is stopped in an ON duration of a main switching element 14 and the transformer 86 as an inductance element is excited by the input DC power supply 12. In the OFF duration of the main switching element 14, excitation energy accumulated in the transformer 86 is released to an output side via a rectifier 72 and power is supplied to the load 22.

The control circuit 82 operates similarly to the control circuit 82 of the above-described switching power supply unit 80. An unillustrated calculation means or other means performs sampling at a time instant immediately after the main switching element 14 is turned off in each cycle of switching of the main switching element 14 in order to avoid the uncontrollability of the output. An unillustrated drive pulse generation means generates a drive pulse V14 in which a duration starting from immediately before the time instant for sampling is set to be the OFF duration of the main switching element 14.

The thus-configured switching power supply unit 90, which is provided with a flyback power converter circuit and in which control is performed in the same manner as in the switching power supply unit 80 provided with a step-up and step-down chopper power converter circuit, has the same advantageous effect as that of the switching power supply unit 80.

Figure 19:
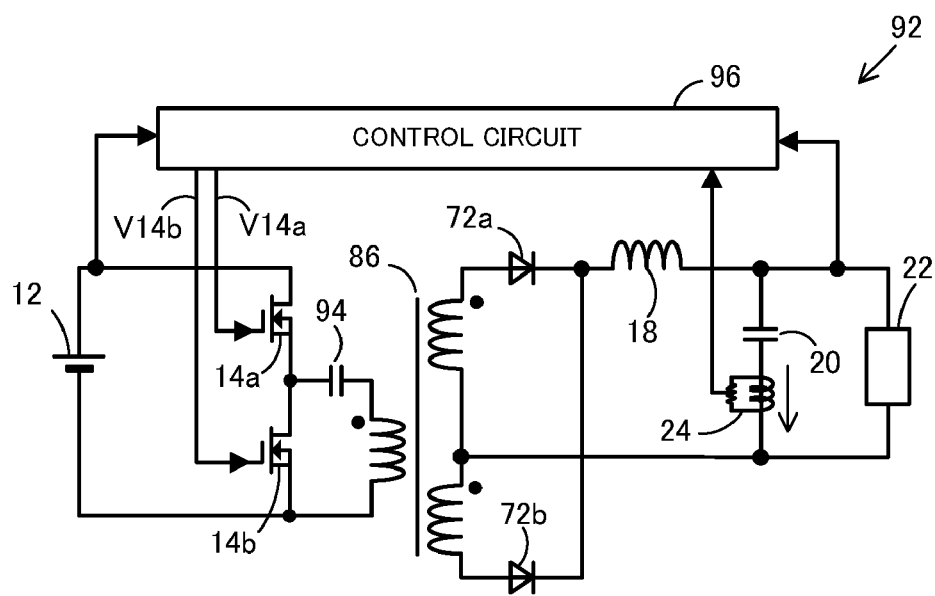
FIG. 19 is a circuit diagram of a switching power supply unit according to a tenth embodiment of the present invention.

Next, a switching power supply unit 92 according to a tenth embodiment of the present invention will be described with reference to FIG. 19. In the description, components similar to those of the switching power supply unit 70 according to the fifth embodiment will be denoted by similar reference numerals. The switching power supply unit 92 includes a common half bridge power converter circuit which is constituted by two main switching elements 14*a* and 14*b*, a coupling capacitor 94, a transformer 86, two rectifiers 72*a* and 72*b*, a smoothing inductor 18 and a smoothing capacitor 20. In this power converter circuit, the main switching elements 14*a* and 14*b* receive drive pulses V14*a* and V14*b* from the control circuit 96 and are controlled to be alternately turned on and off in each cycle of switching. In the ON duration of the main switching elements 14*a* and 14*b*, power is supplied from an input DC power supply 12 to an output side load 22 via the transformer 86 and the rectifiers 72*a* and 72*b* and the smoothing inductor 18 is excited by the input DC power supply 12. Excitation energy accumulated in the smoothing inductor 18 is released in an OFF duration of the main switching elements 14*a* and 14*b* and the power is supplied to an output side load 22.

As in the control circuit 74 of the above-described switching power supply unit 70, in the control circuit 96, an unillustrated calculation means or other means performs sampling at a time instant at which the main switching element 14a or 14b are turned off in each cycle of switching in order to avoid the uncontrollability of the output. An unillustrated drive pulse generation means generates the drive pulses V14a and V14b in which a duration starting from the time instant for sampling is set to be the OFF duration of the main switching element 14a or 14b.

The thus-configured switching power supply unit 92, which is provided with a half bridge power converter circuit having plural main switching elements and in which control is performed in the same manner as in the switching power supply unit 70 provided with a step-down chopper power converter circuit, has the same advantageous effect as that of the switching power supply unit 70. Other switching power supply units provided with a power converter circuit with a plurality of switching elements, such as a push pull power converter circuit, a full bridge power converter circuit and a cascade forward power converter circuit, may also be configured from a point of view similar to that of the switching power supply unit 92.

Figure 20:
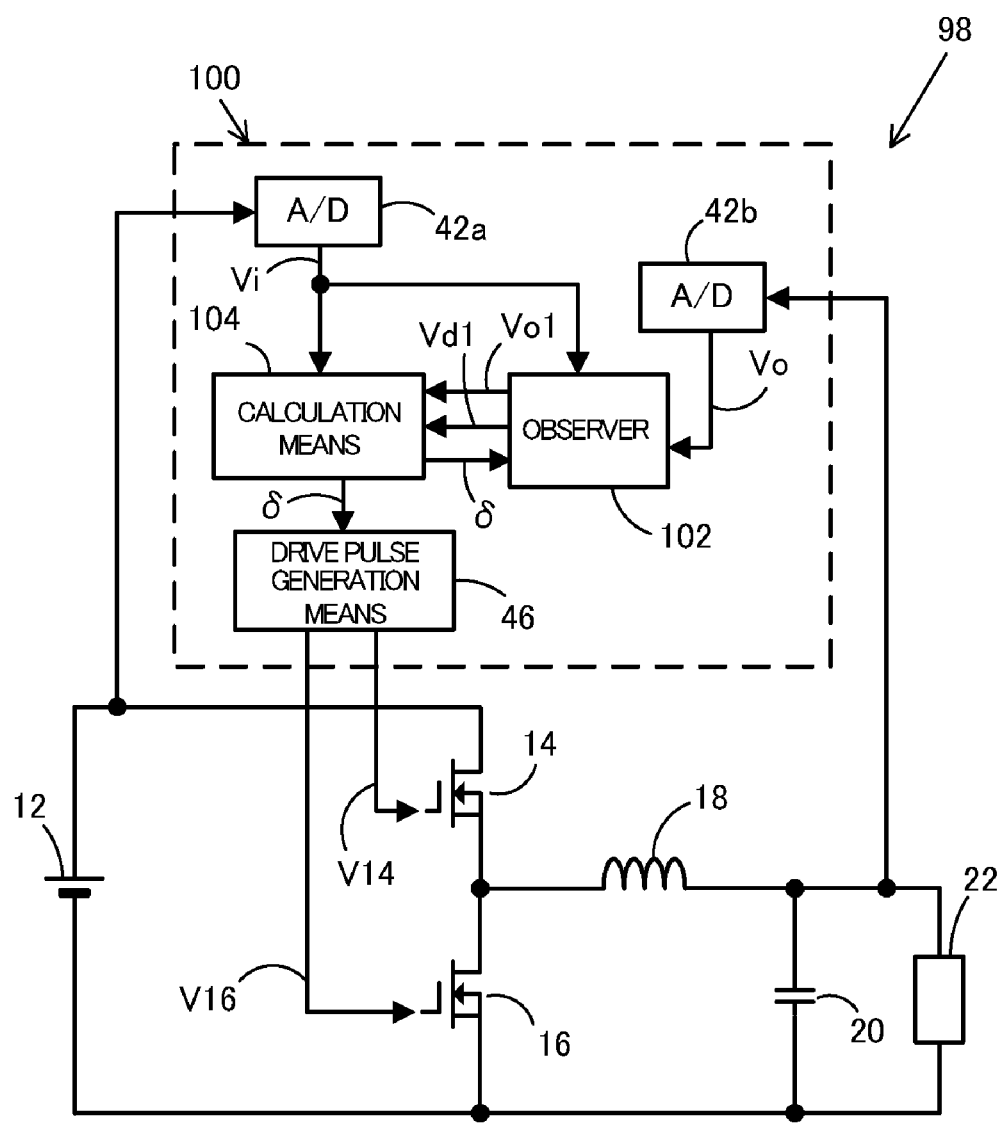
FIG. 20 is a circuit diagram of a switching power supply unit according to an eleventh embodiment of the present invention.

Next, a switching power supply unit 98 according to an eleventh embodiment of the present invention will be described with reference to FIG. 20. In the description, components similar to those of the switching power supply units 10 and 40 will be denoted by similar reference numerals. A power converter circuit of the switching power supply unit 98 is configured as a step-down chopper as in the switching power supply unit 10 illustrated in FIG. 1.

The control circuit 100 includes A/D converters 42a and 42b, an observer 102, a calculation means 104 and a drive pulse generation means 46. In the present embodiment, the observer 102 is provided instead of the capacitor current detection circuit 34 and the A/D converter 26c which outputs the capacitor current signal Ic of the above-described switching power supply unit 10, and the calculation means 104 which operates in correspondence with the observer 102 is provided instead of the calculation means 30. Further, instead of the A/D converters 26a and 26b and the drive pulse generation means 32, the A/D converters 42a and 42b and the drive pulse generation means 46 similar to those of the above-described switching power supply unit 40 are provided in the present embodiment.

Analog information of which input voltage and output voltage are detected is input to the A/D converters 42a and 42b. The A/D converters 42a and 42b sample the input information at predetermined time instants, convert the information into digital information and output the same as an input voltage signal Vi and an output voltage signal Vo. The sampling is performed for each half of the cycle of switching of a main switching element 14. The sampling is performed at arbitrary time instants in the ON duration of the main switching element 14 or in a duration in which a smoothing inductor 18 is releasing, to the output side, excitation energy accumulated in the ON duration.

The observer 102, which is also called an observing device, is a device for estimating various state variables of a circuit and has a function to estimate operating status of parts for which detection is difficult, using detection values (i.e., measurement values). Here, the observer 102 estimates and outputs an output voltage signal Vo1 and an output voltage differential value Vd1 which are to be detected at the next time instant for sampling based on an input voltage signal Vi and an output voltage signal Vo which are relatively easily detectable, and based on the duty ratio δ determined by the calculation means 104 immediately before the sampling.

The calculation means 104 samples the input voltage signal Vi which is a detection value and the output voltage signal Vo1 and the output differential signal Vd1 which are estimates at predetermined time instants in each half the cycle of switching described above. As in the above-described calculation means 44, the calculation means 104 performs a predetermined calculation based on these three signals and calculates a duty ratio δ of a duration after the next time instant for sampling. The calculation means 104 also outputs the duty ratio calculated before to the observer 102.

Figure 21:
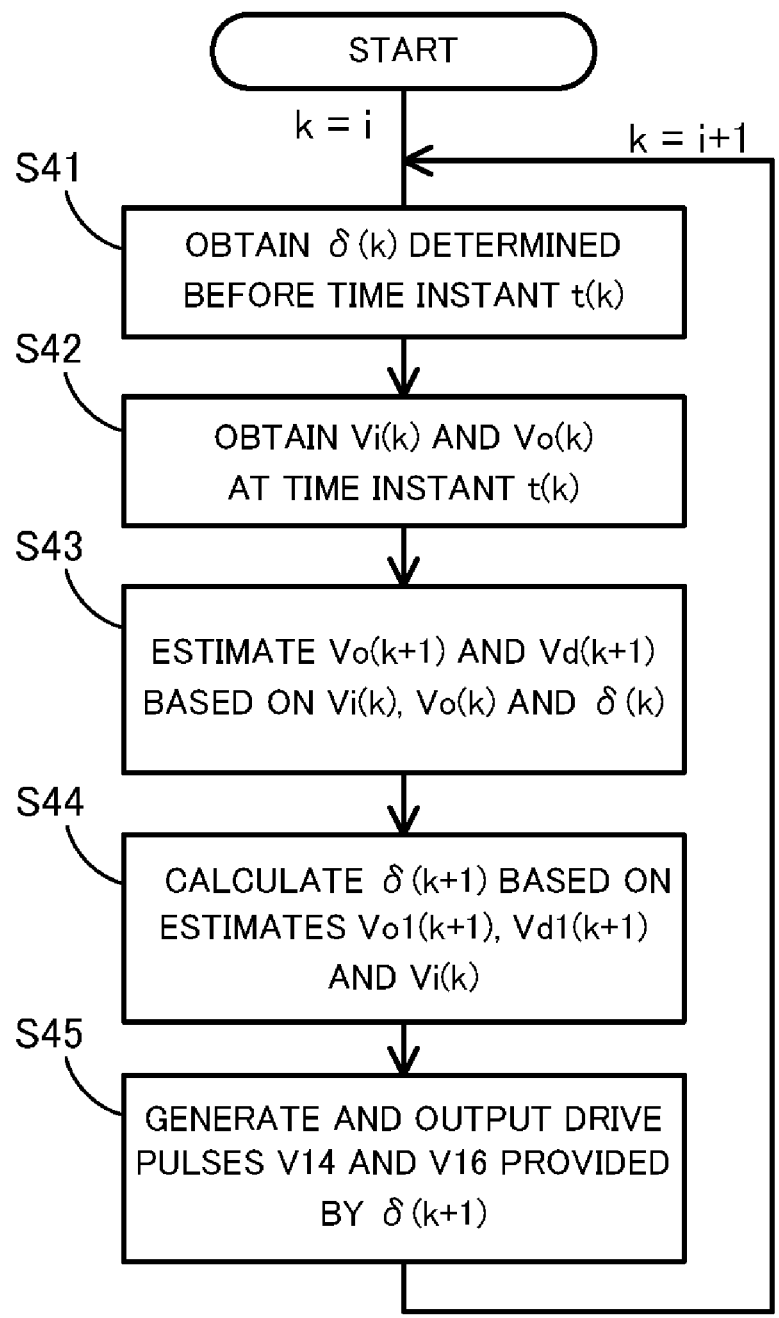
FIG. 21 is a flowchart illustrating a steady-state operation according to the eleventh embodiment of the present invention.

Hereinafter, the steady-state operation of the switching power supply unit 98 will be described with reference to a flowchart of FIG. 21. A timing diagram representing the operation of the switching power supply unit 98 is substantially the same as that of FIG. 7 representing the operation of the above-described switching power supply unit 40.

First, at the time instant t(k), the observer 102 obtains the duty ratio δ(k) determined by the calculation means 104 before the time instant t(k) (step S41). At the same time instant t(k), the observer 102 samples an input voltage signal Vi(k) and an output voltage signal Vo(k) as detection values (step S42). The observer 102 outputs an output voltage signal Vo1(k+1) and an output differential signal Vd1(k+1) as estimates based on the input voltage signal Vi(k), the output voltage signal Vo(k) and the duty ratio δ(k) (step S43).

Then, the calculation means 104 samples the input voltage signal Vi(k), the output voltage signal Vo1 (k+1) and the output differential signal Vd1(k+1), and calculates the duty ratio δ(k+1) after the next time instant t(k+1) for sampling through a predetermined calculation (step S44). Next, the drive pulse generation means 46 generates a drive pulse V14 and a drive pulse V16 after the time instant t(k+1) based on the duty ratio δ(k+1) (step S45).

A PWM control is performed on the switching power supply unit 98 by repeating steps S41 to S45 such that the output voltage might be equal to the target value Vref. The switching power supply unit 98 can obtain the output differential signal Vd (here the estimate Vd 1) without the need of providing a capacitor current detection means 34. Thus, the capacitor current detection means which deals with a relatively large current can be omitted and thereby the configuration of the power unit can be simplified.

Figure 22:
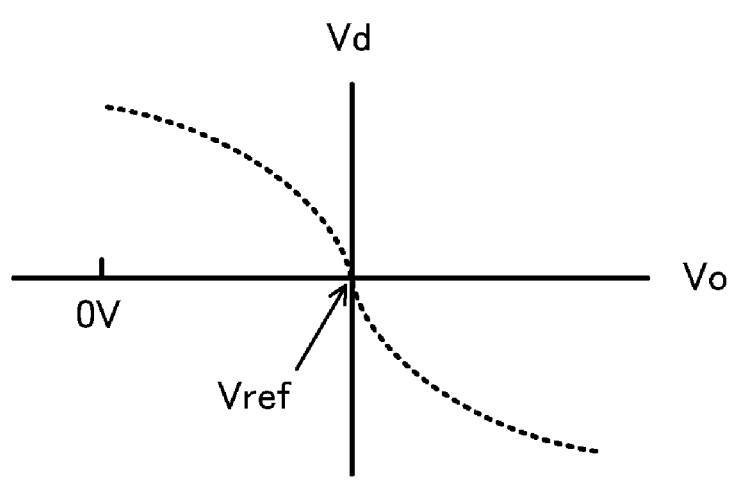
FIG. 22A is a graph of another variant example of the control function formula.
FIG. 22B is a graph of an example of an inappropriate control function formula.
Figure 22:
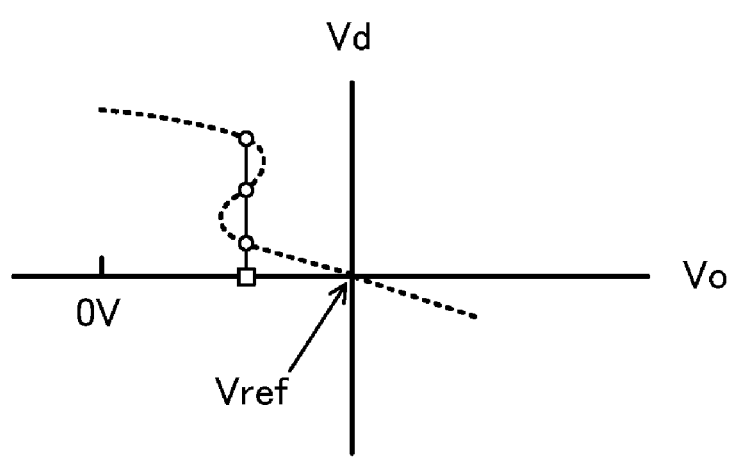

The switching power supply unit according to the present invention is not limited to those of the above-described embodiments. For example, although the control function formula defined in the calculation means of the control circuit is a linear relational formula as represented by Formulae 1 and 12 to 14 for the adjustment of the way of the fluctuation in the output voltage at the time of, for example, placement of an input, the control function formula may alternatively be a curved relational formula as illustrated in FIG. 22A. However, operations of the above-described calculation means cannot be properly performed with a control function formula in which a plurality of differential values exist corresponding to a single value of the output voltage.

As described with reference to the first to tenth embodiments, it is preferable to set conditions like "use a constant cycle of switching" for the calculation of, for example, the ON and OFF durations and the duty ratio of the main switching element by the calculation means of the control circuit. This is because such conditioning can simplify the calculation formula for the calculation of, for example, the duty ratio as given by Formula 11. The present invention can be applied to switching power supply units with various power converter circuits, and the above-described conditioning can be selected suitably depending on the operation of each power converter circuit.

For example, the following control can be applied to the power converter circuit described with reference to the above-described embodiments: PWM control with which the ON and OFF durations are determined under conditions that the cycle of switching is constant (FIGS. 3 and 10); PFM control with which the ON and OFF durations are determined under conditions that the ON duration of the main switching element 14 is constant (FIG. 13); and PFM control with which the ON and OFF durations are determined under conditions that the OFF duration of the main switching element 14 is constant. Among these, the PFM control with which the ON and OFF durations are determined under conditions that the ON duration of the main switching element 14 is constant (FIG. 13) is suitable for, for example, the control of the power converter circuit provided with a current resonance circuit.

Although not described as an embodiment, PFM control with which the ON and OFF durations are determined under conditions that the OFF duration of the main switching element 14 is constant is also applicable. This PFM control is suitable for the control of a power converter circuit provided with, for example, a voltage resonance circuit. In addition, PFM control with which the ON and OFF durations are determined under conditions that the duty ratio in the ON duration with respect to one cycle of switching is constant is also applicable. For example, the PFM control may be applied to the step-up chopper power converter circuit, the step-up and step-down chopper power converter circuit or the flyback type power converter circuit described in the above-described embodiments such that a zero current duration might be produced intentionally. Such PFM control can provide an advantageous effect of preventing occurrence of a recovery current of the rectifier constituted by a diode and preventing occurrence of switching noise or cross loss of the main switching element.

A configuration in which the calculation means or other means performs sampling in a cycle in synchronization with the cycle of switching and the drive pulse generation means generates a drive pulse in which durations before and after the midpoint of the cycle of sampling is set to be an ON duration or an OFF duration of the main switching element (FIGS. 3 and 13) can be applied to any of the power converter circuits of the above-described embodiments by setting the time instant for sampling by the calculation means or other means in a duration other than the zero current duration. According to the configuration, the calculation formula with which the calculation means calculates, for example, the duty ratio can be represented as a relatively simple primary formula as given by Formula 11 and the process can be simplified. Further, even if the calculation means takes some processing time, the influence of the processing time can be eliminated through a suitable adjustment of the setting of the maximum duty ratio Dmax and the minimum duty ratio Dmin. Thus, the configuration has an advantageous effect that the above-described control circuit can be constituted from a relatively inexpensive medium and low speed digital IC.

In a configuration in which a calculation means or other means performs sampling at a predetermined time instant in each half the cycle of switching to obtain a duty ratio δ of a duration until the next time instant for sampling through a predetermined operation (FIG. 6), the calculation means or other means performs sampling also in the ON duration of the main switching element. Such a configuration cannot be applied to the step-up chopper power converter circuit, the step-up and step-down chopper power converter circuit and the flyback power converter circuit, but can be applied to the step-down chopper power converter circuit, the single-ended forward power converter circuit and the half bridge power converter circuit.

As a means for obtaining the output differential signal Vd, a differentiation circuit which detects an output voltage and performs a differential process may be provided instead of a capacitor current detection means or an observer. In particular, a configuration in which the output voltage signal obtained via the A/D converter is differentiated and output as an output differential signal Vd and a configuration in which an output differential voltage subject to analog amplification is converted and output to the output differential signal Vd via the A/D converter can be applied.

What is claimed is:

1. A switching power supply unit comprising:
    a power converter circuit including a main switching element which is turned on and off; and
    a control circuit which regulates an output voltage by controlling turning on and off operation of the main switching element, wherein:
    the control circuit includes calculation means which determines an ON duration and an OFF duration of the main switching element and drive pulse generation means which generates drive pulses with which the main switching element is turned on and off;
    a control function formula is defined in the calculation means, the control function formula being a continuous function formula which includes, as parameters, an output voltage and an output differential value representing a fluctuation in the output voltage, and has only a single output differential value corresponding to a certain value of the output voltage, the control function formula providing that a corresponding output differential value is positive when an output voltage is below a target value for a regulation of the output voltage, that a corresponding output differential value is negative when an output voltage is above the target value and that a corresponding output differential value is zero when an output voltage is equal to the target value;
    the calculation means samples an input voltage signal of which input voltage has been detected, an output voltage signal of which output voltage has been detected or estimated and an output differential signal of which a fluctuation in an output voltage has been detected or estimated, at time instants in synchronization with a cycle of switching of the main switching element, performs a predetermined calculation based on the sampled three signals and calculates at least one of the ON and OFF durations of the main switching element in a cycle of switching after the time instant for sampling and, in the ON and OFF durations, an output voltage and an output differential value at the next or after the next time instant for sampling satisfy a relationship provided by the control function formula; and
    the drive pulse generation means generates the drive pulses such that the main switching element might be turned on and off in a cycle of switching after the time instant for sampling of the three signals based on the ON and OFF durations determined by the calculation means.

2. The switching power supply unit according to claim 1 wherein the calculation means performs the sampling of each signal and the calculation for obtaining at least one of the ON and OFF durations, in each cycle of switching of the main switching element.

3. The switching power supply unit according to claim 2 wherein:
    the power converter circuit stops supplying power to an output from an input DC power supply and a built-in inductance element is excited by the input DC power supply in the ON duration of the main switching element, and releases excitation energy accumulated in the inductance element to the output and supplies power in the OFF duration of the main switching element; and the calculation means performs the sampling of each signal in the duration in which the inductance element is releasing excitation energy.

4. The switching power supply unit according to claim 2 wherein the drive pulse generation means generates a drive pulse in which the same durations are set as the ON duration of the main switching element before and after a midpoint of the cycle of sampling of each signal, or generates a drive pulse in which the same durations are set as the OFF duration of the main switching element before and after the midpoint of the cycle of sampling.

5. The switching power supply unit according to claim 1, wherein:

the power converter circuit supplies power to an output in the ON duration of the main switching element and excites a built-in inductance element with the input DC power supply to release excitation energy accumulated in the inductance element in the OFF duration of the main switching element to continuously supply the power to the output;

the calculation means performs the sampling of each signal and the calculation for calculating at least one of the ON and OFF durations in half a cycle of switching of the main switching element; and the drive pulse generation means generates a drive pulse in which durations before and after a second time instant for sampling in one cycle of switching are set to be ON durations of the main switching element or generates a drive pulse in which durations before and after a second time instant for sampling in one cycle of switching are set to be OFF durations of the main switching element.

6. The switching power supply unit according to claim 1, further comprising a capacitor current detection circuit which detects a current which flows through a smoothing capacitor and outputs a capacitor current signal, an output voltage being generated at both sides of the smoothing capacitor, wherein the calculation means samples an input voltage signal of which input voltage has been detected, an output voltage signal of which output voltage has been detected and a capacitor current output signal output from the capacitor current detection means and, based on the sampled three signals, performs a predetermined calculation using the capacitor current signal as a signal corresponding to the output differential signal.

7. The switching power supply unit according to claim 1, further comprising a differentiation circuit in which an output voltage is input and which outputs an output differential signal obtained through differentiation of the output voltage, wherein the calculation means samples an input voltage signal of which input voltage has been detected, an output voltage signal of which output voltage has been detected and an output differential signal output from the differentiation circuit and performs a predetermined calculation based on the sampled three signals.

8. A switching power supply unit according to claim 1, wherein:

the control circuit includes an observer which is a device of estimating a state variable of a circuit, the observer samples, at a time instant at which the calculation means samples the input voltage signal, the input voltage signal and an output voltage signal of which output voltage has been detected, and the calculation means obtains the ON and OFF durations determined immediately before the time instant for sampling and, based on the input voltage signal, the output voltage signal and a duty ratio, estimates an output voltage signal and the output differential signal at the next time instant for sampling; and the calculation means samples the input voltage signal, and the output voltage signal and the output differential signal estimated by the observer and performs a predetermined calculation based on the sampled three signals.

9. A switching power supply unit according to claim 1, wherein the control function formula defined in the calculation means is characterized in that a relationship between an output voltage and an output differential value is provided by a linear function with a negative slope.

10. The switching power supply unit according to claim 1 wherein the control function formula defined in the calculation means is characterized in that the output differential value is made constant regardless of the output voltage in a range in which a difference between an output voltage and a target value exceeds a predetermined value.

11. The switching power supply unit according to claim 1 wherein the calculation means calculates the ON and OFF durations such that the total length of the ON and OFF durations might be constant.

12. The switching power supply unit according to claim 11 wherein:

when the ON and OFF durations determined by the calculation means exceed a maximum duty ratio which is variable as an ON-duration duty ratio, the drive pulse generation means generates a drive pulse with which the main switching element is turned on or off at the maximum duty ratio; and when the ON and OFF durations determined by the calculation means are below a minimum duty ratio which is variable as an ON-duration duty ratio, the drive pulse generation means generates a drive pulse with which the main switching element is turned on or off at the minimum duty ratio.

13. The switching power supply unit according to claim 1 wherein the calculation means calculates the OFF duration or the ON duration such that the ON duration or the OFF duration might be constant.

14. The switching power supply unit according to claim 1 wherein the calculation means calculates the ON and OFF durations such that an ON-time duty ratio with respect to a cycle of switching might be constant.

15. The switching power supply unit according to claim 14 wherein:

when the total length of the ON and OFF durations determined by the calculation means exceeds the variable maximum duration, the drive pulse generation means generates a drive pulse with which the main switching element is turned on or off in the maximum duration, and when the total length of the ON and OFF durations determined by the calculation means is below the variable minimum duration, the drive pulse generation means generates a drive pulse with which the main switching element is turned on or off in the minimum duration.

* * * * *